US006982712B2

(12) United States Patent
Ohto

(10) Patent No.: US 6,982,712 B2
(45) Date of Patent: Jan. 3, 2006

(54) THREE-DIMENSIONAL MODEL GENERATING SYSTEM AND METHOD, AND COMPUTER PROGRAM THEREFOR

(75) Inventor: Yasunori Ohto, Tokyo (JP)

(73) Assignee: Sony Corporation, Tokyo (JP)

( * ) Notice: Subject to any disclaimer, the term of this patent is extended or adjusted under 35 U.S.C. 154(b) by 342 days.

(21) Appl. No.: 10/392,864

(22) Filed: Mar. 21, 2003

(65) Prior Publication Data

US 2003/0184545 A1 Oct. 2, 2003

(30) Foreign Application Priority Data

Mar. 27, 2002 (JP) ............................ 2002-089967

(51) Int. Cl.
*G06T 17/00* (2006.01)
*G06T 15/00* (2006.01)
*G01V 3/38* (2006.01)

(52) U.S. Cl. .......................... 345/420; 345/419; 702/5

(58) Field of Classification Search ................ 345/420, 345/419; 702/5
See application file for complete search history.

(56) References Cited

U.S. PATENT DOCUMENTS 5,467,444 A * 11/1995 Kawamura et al. ......... 345/441
6,288,721 B1 * 9/2001 Donoghue et al. .......... 345/426
6,441,816 B1 * 8/2002 Nguyen et al. ............. 345/420
6,654,690 B2 * 11/2003 Rahmes et al. ................ 702/5
2002/0085014 A1 * 7/2002 Yuda et al. ................. 345/582
2002/0167515 A1 * 11/2002 Kamen et al. ............. 345/420

OTHER PUBLICATIONS

Fischer et al., "Extracting Buildings from Aerial Images Using Hierarchical Aggregation in 2D and 3D", Computer Vision and Image Understanding, vol. 72, No. 2, Nov. 1998, Article No. IV9800721, Copyright © 1998 by Academic Press.*

* cited by examiner

*Primary Examiner*—Ulka J. Chauhan
*Assistant Examiner*—Roberta Prendergast
(74) *Attorney, Agent, or Firm*—Oblon, Spivak, McClelland, Maier & Neustadt, P.C.

(57) ABSTRACT

A three-dimensional model generating system obtains altitude information corresponding to a specified building region on a building/road map. On the basis of the altitude distribution in the building region, a plane corresponding to a connected subset of observation data is obtained. After all pieces of observation data are allocated to planes, the planes are interconnected to form a simply-connected polyhedron serving as a building model. Accordingly, individual pieces of building information, which are free from the effects of a building-located region, are generated on the basis of three-dimensional terrain information and a set of planes.

6 Claims, 21 Drawing Sheets

THREE-DIMENSIONAL MODEL GENERATING SYSTEM AND METHOD, AND COMPUTER PROGRAM THEREFOR

BACKGROUND OF THE INVENTION

1. Field of the Invention

The present invention relates to three-dimensional model generating systems and methods and computer programs therefor for extracting the three-dimensional shape of the ground on the basis of altitude information of the ground, which is obtained by an airplane, a satellite, or the like. In particular, the present invention relates to a three-dimensional model generating system and method and a computer program therefor for creating the appearance of a building having a three-dimensional shape on the basis of altitude information mapped onto a two-dimensional plane.

More particularly, the present invention relates to a three-dimensional model generating system and method and a computer program therefor for creating appearance information of individual buildings from altitude information mapped onto a two-dimensional plane and a building/road map. In particular, the present invention relates to a three-dimensional model generating system and method and a computer program therefor for generating building information in a more accurate manner regardless of the region in which the building is located.

2. Description of the Related Art

With the recent innovation of information technology, various types of information content are created and edited on computers to offer services such as information storage and information distribution. For example, map information indicating buildings and roads is integrated with geographic information on a computer to offer services that present regional information using map images for road guidance and tourist information. Also, real-time navigation services have been offered to mobile stations such as vehicles and ships using a user's current position information detected by GPS (Global Positioning System) or the like.

A map or geographic information is not only obtained by measurement on the ground, but also created on the basis of the results of observation from space by an airplane, a satellite, or the like. A recent airplane with a range sensor can compute the three-dimensional shape of the ground on the basis of measured altitude information of the ground. Maps, in general, are orthographic projections, whereas aerial photographs and satellite photographs are central projections. Altitude information measured from space is compensated for geographical errors, and the altitude information is made into an ortho-image on the basis of the accurate geographic information. As a result, the altitude information is mapped to each observation point on a map. In the description, "elevation-data" refers to data generated by mapping altitude information to each observation point on a two-dimensional plane.

Basically, map information is two-dimensional planar position information. The integration of the map information with such altitude information allows the relief of the ground to be represented. As a result, for example, a navigation system displays a stereoscopic three-dimensional map image by taking the relief of the ground and landscape into consideration. Such higher quality map information display services are thus offered. Alternatively, the three-dimensional map information is applied to public services such as flood control simulation or systems using virtual space.

Other applications of the altitude information include the creation of three-dimensional shape of a building. Specifically, a region in which a building is located (building-located region) is obtained from altitude information arranged on a two-dimensional plane and a separately prepared building map. The altitude is computed by smoothing the altitude information included in the building-located region. The altitude of the building-located region is raised by an amount equal to the computed altitude, thereby creating the three-dimensional shape of the building.

In such a case, a building such as a pyramid-shaped building having a shape that cannot be created by raising the bottom surface thereof experiences a problem in that a model having a different three-dimensional shape is created.

SUMMARY OF THE INVENTION

Accordingly, it is an object of the present invention to provide an improved three-dimensional model generating system and method and a computer program therefor for suitably extracting the three-dimensional shape of the ground on the basis of altitude information of the ground, which is obtained by an airplane, a satellite, or the like.

It is another object of the present invention to provide an improved three-dimensional model generating system and method and a computer program therefor for suitably creating appearance information of individual buildings from altitude information mapped onto a two-dimensional plane and a building/road map.

It is a further object of the present invention to provide an improved three-dimensional model generating system and method and a computer program therefor for generating building information in a more accurate manner regardless of the building-located region.

In order to achieve the foregoing objects, according to a first aspect of the present invention, there is provided a three-dimensional model generating system or method for generating a building model on the basis of map information describing the arrangement of building regions and roads on a two-dimensional plane and elevation-data that is generated by mapping altitude information to each observation point on the two-dimensional plane. The system or method includes a coordinate transform obtaining unit or step that performs coordinate transformation from the map information to the elevation-data; a building region extracting unit or step that arranges the altitude information according to each building region; a plane extraction unit or step that extracts planes including the altitude information on the basis of the altitude information according to each building region; a boundary line identifying unit or step that identifies a boundary between the planes; and a plane connection unit or step that connects the planes, between which the boundary has been identified, whereby the building model formed of a simply-connected polyhedron is generated.

The word "system" refers to a logical set of apparatuses (or functional modules for realizing specific functions). The apparatuses or functional modules need not be contained in a single casing.

According to the three-dimensional model generating system or method according to the first aspect of the present invention, altitude information of a building region that is specified on a building/road map is obtained from elevation-data. On the basis of the altitude distribution in the building region, a plane corresponding to a connected subset of observation data is obtained. After all pieces of observation data are allocated to planes, the planes are interconnected to create a simply-connected polyhedron serving as a building model. Individual building information can be accurately generated as a simply-connected polygon object constructed of planes from altitude information arranged on a two-dimensional plane and a building/road map. Three-dimensional terrain information that is free from the effects of a building-located region and individual building information formed of a set of planes can be generated.

The plane extraction unit or step may extract, as vertices constructing a plane in a building location boundary, observation points whose altitude information are contained by the same plane within an acceptable error range, and may generate the plane including the extracted vertices.

The boundary line identifying unit or step may extract, as boundary vertices of the boundary between the planes in the building location boundary, observation points whose altitude information are not contained by the same plane within the acceptable error range, and may determine the boundary between the planes in the building location boundary on the basis of the extracted boundary vertices. When the boundary between the planes, the boundary being determined on the basis of the boundary vertices extracted in the building location boundary, does not connect to the building location boundary, the boundary line identifying unit or step may add an auxiliary line so that the boundary between the planes connects to the building location boundary.

The boundary line identifying unit or step may create a closed region using the boundary vertices extracted in the building location boundary and part of the building location boundary, the closed region serving as the boundary of the plane.

The boundary line identifying unit or step may determine an existence region in which the boundary between the planes exists. The boundary line identifying unit or step may sets the number of bends to three when the existence region is donut-shaped, and, otherwise, sets the number of bends to zero. The boundary line identifying unit or step may define a boundary existence range on the basis of the bends and parallelism to the building location boundary. When the boundary existence range cannot be specified, the boundary line identifying unit or step may increment the number of bends and may again search for the boundary existence range.

According to a second aspect of the present invention, there is provided a computer program written in a computer readable format to perform, on a computer system, the processing of generating a building model on the basis of map information describing the arrangement of building regions and roads on a two-dimensional plane and elevation-data that is generated by mapping altitude information to each observation point on the two-dimensional plane. The computer program includes a coordinate transform obtaining step of performing coordinate transformation from the map information to the elevation-data; a building region extracting step of arranging the altitude information according to each building region; a plane extraction step of extracting planes including the altitude information on the basis of the altitude information according to each building region; a boundary line identifying step of identifying a boundary between the planes; and a plane connection step of connecting the planes, between which the boundary has been identified, whereby the building model formed of a simply-connected polyhedron is generated.

The computer program according to the second aspect of the present invention defines a computer program written in a computer-readable format to perform predetermined processing on a computer system. In other words, the cooperative operation is achieved on the computer system by installing the computer program according to the second aspect of the present invention into the computer system. Accordingly, operation and advantages similar to those of the three-dimensional model generating system or method according to the first aspect of the present invention are achieved.

According to the present invention, the three-dimensional shape of the ground can be extracted on the basis of altitude information of the ground, which is obtained by an airplane, a satellite, or the like. Also, appearance information of individual buildings can be suitably generated from altitude information mapped onto a two-dimensional plane and a building/road map. Also, a three-dimensional model of a building can be generated in a more accurate manner regardless of the building-located region. In other words, individual building information can be obtained as a simply-connected polygon object constructed of planes from altitude information arranged on a two-dimensional plane and a building/road map. More accurate building data can thus be generated in the generation of a three-dimensional virtual space based on the real word.

Further objects, features, and advantages of the present invention will become apparent from the following description of the preferred embodiments with reference to the attached drawings.

DESCRIPTION OF THE PREFERRED EMBODIMENTS

With reference to the drawings, embodiments of the present invention will be described in detail.

Figure 1:
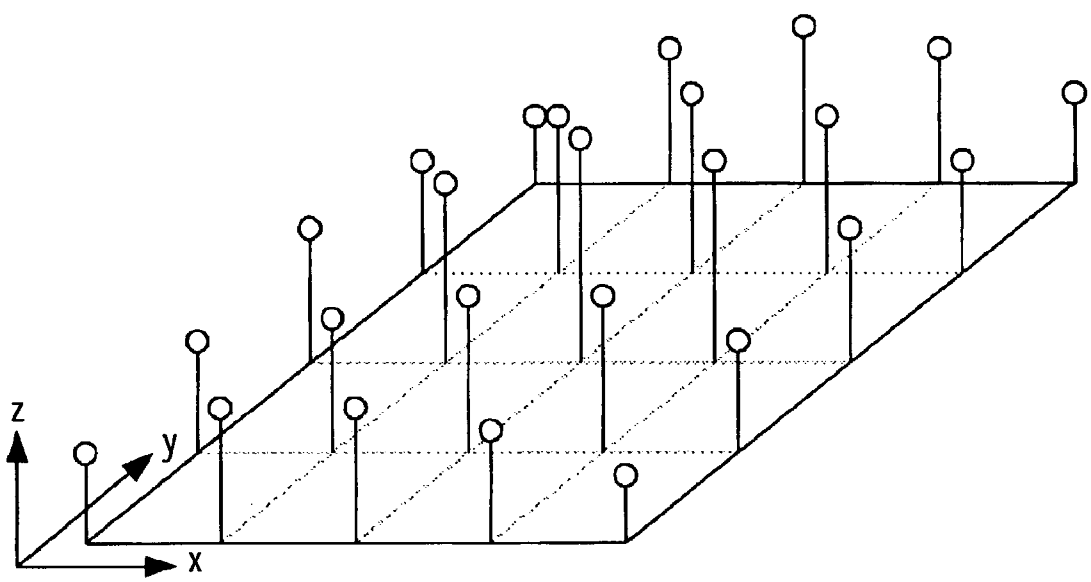
FIG. 1 is an illustration of the mapping of altitude information onto a two-dimensional plane.

FIG. 1 shows the mapping of altitude information onto a two-dimensional plane. The two-dimensional plane shown in FIG. 1 represents the ground surface of a plain, mountain, suburb, or central city. Altitude information or elevation-data is obtained at predetermined intervals in the x and y directions and represented as a z-coordinate value of each point at the coordinates (x, y). The x and y axes correspond to, for example, the latitude and longitude, respectively.

Two-dimensional plane information including such altitude information covering an extensive region can be directly and easily generated by, for example, obtaining a range from space to the ground using an airplane, a satellite, or the like. Altitude information measured from space is compensated for geographical errors, and the altitude information is made into an ortho-image on the basis of the accurate geographic information. As a result, the altitude information is mapped to each observation point on a map.

Figure 2:
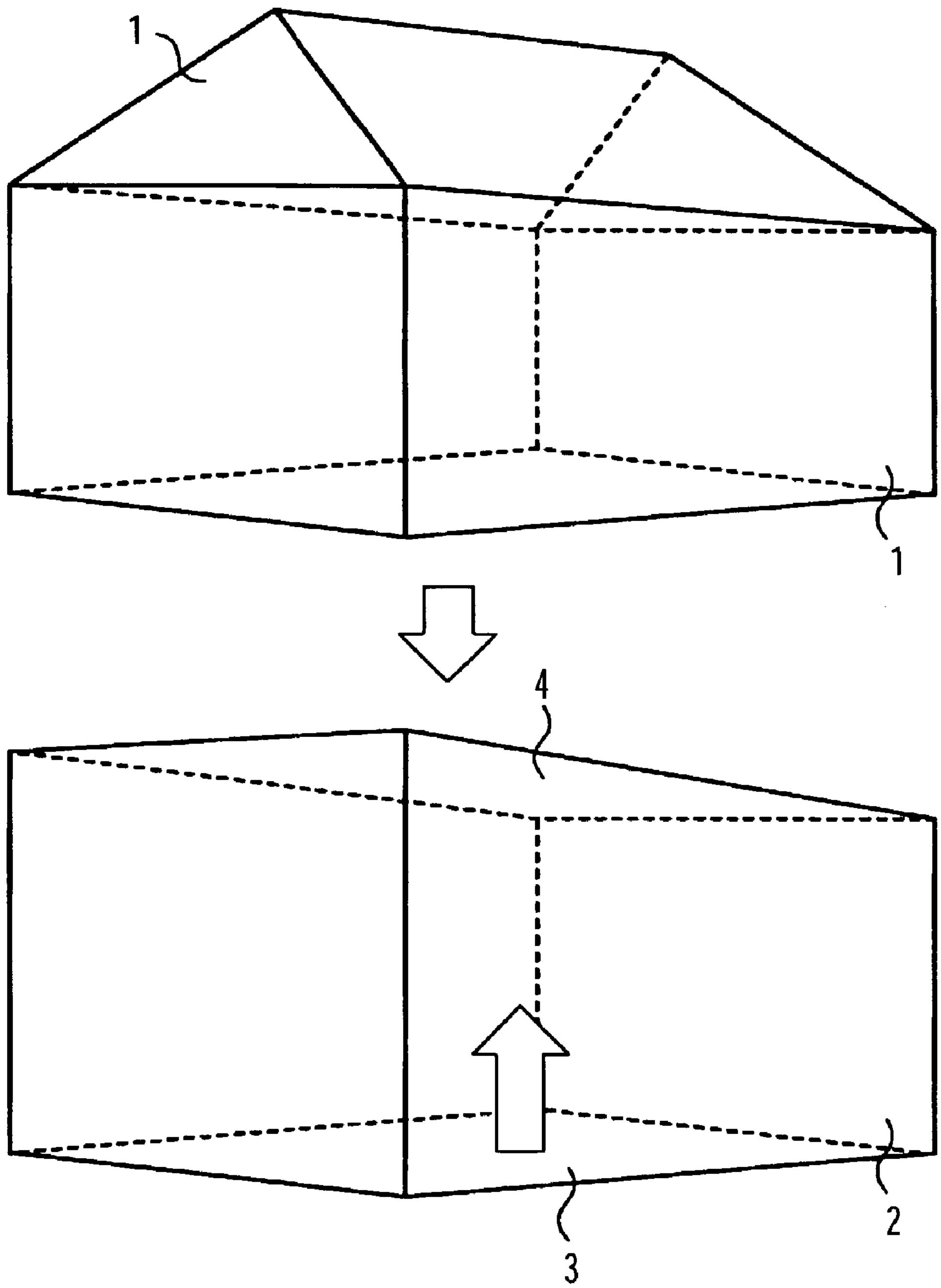
FIG. 2 illustrates a known building information generating method for generating a building by sweeping upwards a building-located region.

FIG. 2 shows a known building information generating method for generating a building by sweeping upwards a building-located region. A building shape 2 is generated by sweeping a bottom surface 3 relative to the actual building shape 1. In such a case, a roof portion 4 becomes flat. In contrast, in this embodiment, altitude information of a specified building region is obtained from elevation-data. On the basis of the altitude distribution in the building-located region, a plane corresponding to a connected subset of observation data is obtained. After all pieces of observation data are allocated to planes, the planes are interconnected to create a simply-connected polyhedron serving as a building model.

Figure 3:
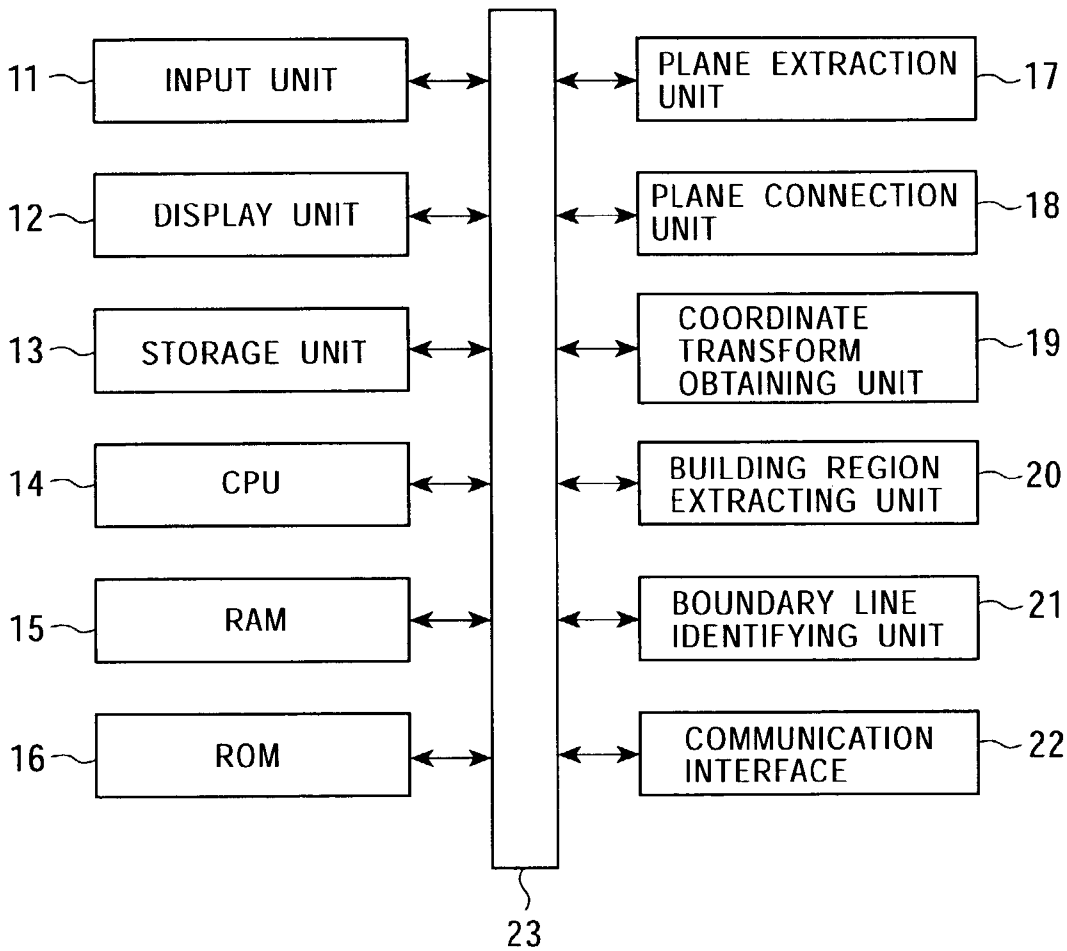
FIG. 3 is a block diagram showing the schematic functional configuration of a three-dimensional model generating system according to an embodiment of the present invention.

FIG. 3 schematically shows the functional configuration of a three-dimensional model generating system according to the embodiment of the present invention.

In the three-dimensional model generating system, a CPU (Central Processing Unit) 14 activates various application programs in an execution environment provided by an OS (Operating System). The CPU 14 is interconnected via a bus 23 to components in the system.

A RAM (Random Access Memory) 15 is a volatile semiconductor memory. The RAM 15 is used to load therein program code to be executed by the CPU 14 from an external storage unit such as a storage unit 13 (described below) and to temporarily store work data being processed by an executed program.

The programs executed by the CPU 14 include a three-dimensional model generating application for generating a building model on the basis of altitude information of a building region on a two-dimensional plane. The work data includes two-dimensional plane information such as building information and road map information, elevation-data mapped onto the two-dimensional plane information, and building models being computed or have been computed as a result of computing based on the elevation-data.

A ROM (Read Only Memory) 16 is a non-volatile semiconductor memory and is used to permanently store predetermined program code and data. The ROM 16 stores, for example, a power-on self-test (POST) program activated upon activation of the system, a basic input/output software (BIOS) for operating the hardware component in the system, and the like.

An input unit 11 is formed of, for example, a user input unit such as a keyboard or a mouse. The input unit 11 is used to manually input, or by any other methods, raw data such as building information, road map information, and elevation-data for generating three-dimensional terrain information or to input a user command for generating three-dimensional terrain information or other user commands.

A display unit 12 is formed of a display or a printer that visualizes the arithmetic computation results by the CPU 14 and outputs the results to a user. For example, the display unit 12 displays and outputs building/road map information, i.e., map information comprising building and road data, or a three-dimensional model generated from elevation-data mapped onto a two-dimensional plane.

The storage unit 13 is formed of, for example, a high-capacity fixed external storage unit such as a hard disk drive (HDD) or a read/write unit such as a CD(DVD)-ROM drive including a portable recording medium.

The HDD is an external storage unit having a magnetic disk serving as a fixed storage medium (as is well known). The HDD is superior to other external storage units because of the storage capacity and data transfer rate. Placing a software program in an executable state on the HDD is referred to as "installing" of the program into the system. Generally, the HDD has stored therein program code of the operating system, application programs, and device drivers that are to be executed by the CPU 14 in a nonvolatile manner. For example, the three-dimensional model generating application for generating a building model on the basis of altitude information of a building region on a two-dimensional plane can be installed on the HDD. Two-dimensional plane information such as building information and road map information, which is processed during the three-dimensional terrain information generation, elevation-data, building models computed on the basis of elevation-data, and other libraries can be stored on the HDD.

The portable recording medium is primarily used to back up software programs and data files in the form of data in a computer-readable format or to transfer such software programs and data files between systems (including sales and distribution). For example, the three-dimensional model generating application for generating a building model on the basis of altitude information of a building region on a two-dimensional plane can be physically distributed among a plurality of apparatuses using such portable recording media. Such portable recording media are used to provide, to the outside of the system, two-dimensional plane information such as building information and road map information, which is processed during the three-dimensional terrain information generation, elevation-data, and building models that are supplied with other libraries and/or computed on the basis of elevation-data.

A communication interface 22 connects the system to a local network such as a LAN (Local Area Network) and, furthermore, to a WAN (Wide Area Network) such as the Internet in accordance with predetermined communication protocols such as Ethernet (registered trademark). A plurality of host terminals (not shown) are transparently connected to one another on the network to construct a distributed computing environment. Distribution services providing software programs and data content can be offered on the network.

For example, the three-dimensional model generating application for generating a building model on the basis of altitude information of a building region on a two-dimensional plane can be downloaded via the network. The network is used to provide, to the outside of the system, two-dimensional plane information such as building information and road map information, which is processed during the three-dimensional terrain information generation, elevation-data, and building models that are supplied with other libraries and/or computed on the basis of elevation-data.

A plane extraction unit 17, a plane connection unit 18, a coordinate transform obtaining unit 19, a building region extracting unit 20, and a boundary line identifying unit 21 cooperate with the CPU 14 to realize the three-dimensional model generation for generating a building model on the basis of altitude information of a building region on a two-dimensional plane. The coordinate transform obtaining unit 19 performs coordinate transformation from building/road map information to elevation-data. The building region extracting unit 20 arranges elevation-data according to each building region. The plane extraction unit 17 extracts, on the basis of elevation-data on each building region, a plurality of planes including the elevation-data. At the same time, the boundary line identifying unit 21 identifies a boundary between the planes. Subsequently, the plane connection unit 18 connects the planes to construct building information formed of a simply-connected polyhedron.

Figure 4:
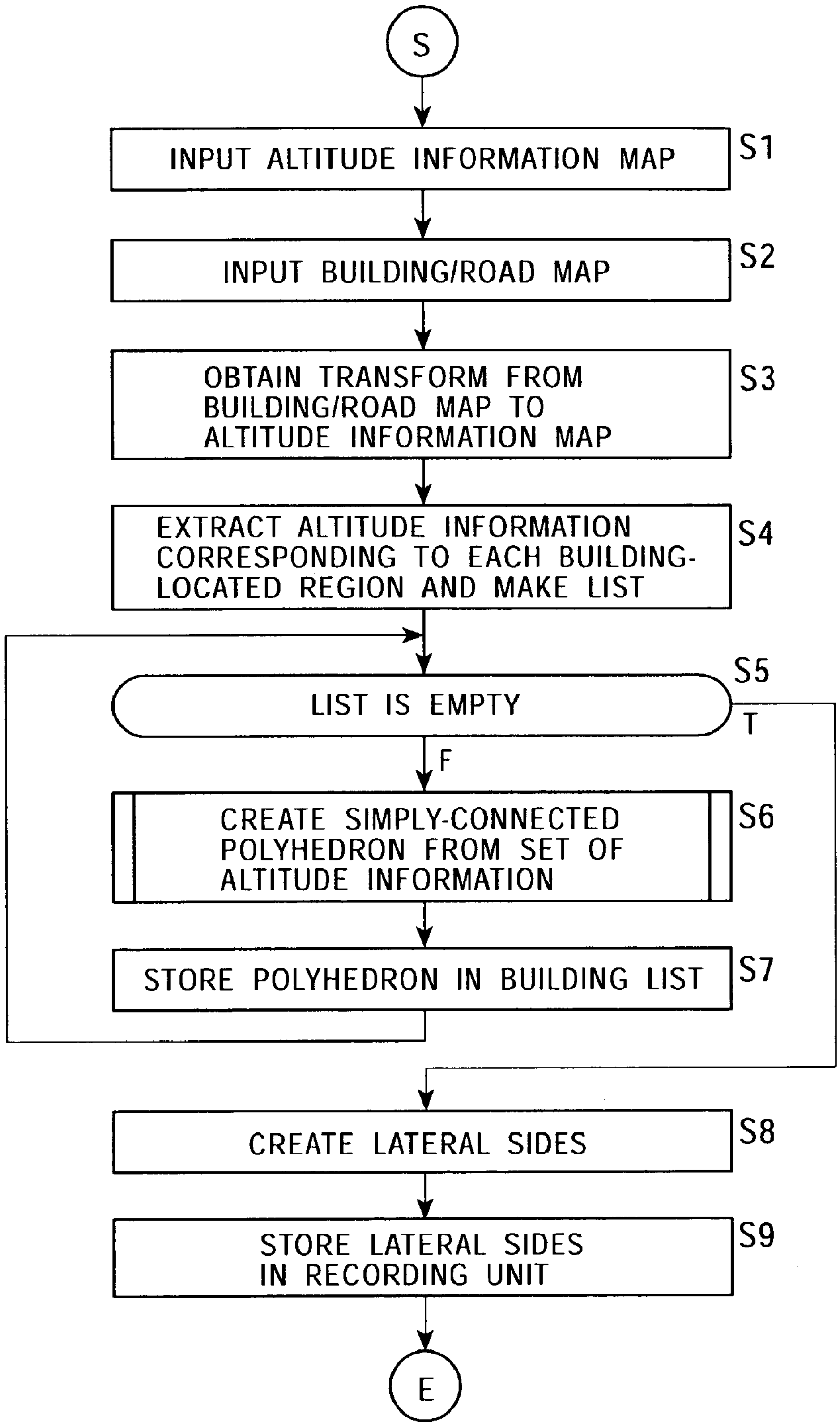
FIG. 4 is a flowchart showing a schematic process of generating a building model on the basis of altitude information of a building region on a two-dimensional plane of this embodiment.

FIG. 4 is a flowchart showing a schematic process of generating a building model on the basis of altitude information of a building region on a two-dimensional plane according to this embodiment. The process is actually realized by executing, by the CPU 14, the three-dimensional model generating application for generating a building model on the basis of altitude information of a building region on a two-dimensional plane in cooperation with the plane extraction unit 17, the plane connection unit 18, the coordinate transform obtaining unit 19, the building region extracting unit 20, and the boundary line identifying unit 21.

Elevation-data generated by mapping altitude information onto a two-dimensional plane is input (step S1), and a building/road map is input (step S2).

A coordinate transform from the building/road map information to the elevation-data is obtained (step S3). The elevation-data existing in each building region is extracted, and sets of buildings and elevation-data are stacked one after another in a list (step S4).

One set of a building and elevation-data is selected after another from the list to create a simply-connected polyhedron (step S6), and the polyhedron is stored in the list (step S7).

If the list is empty (step S5), the lateral sides of the building are created (step S8) and stored in the storage unit 13 (step S9). The entire process routine is completed.

Figure 5:
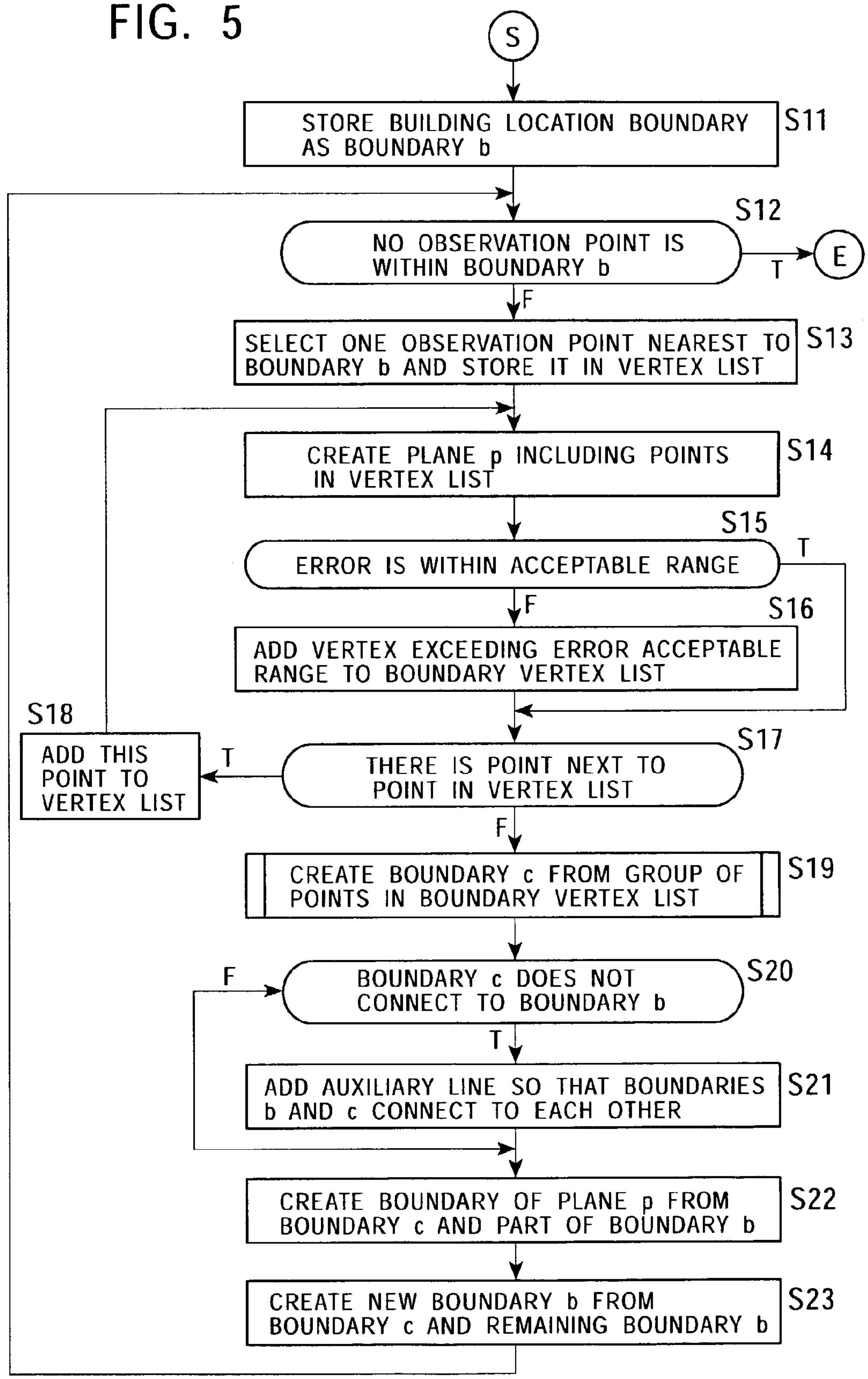
FIG. 5 is a flowchart showing a detailed process of extracting a building as a set of planes.

In step S6, a building is extracted as a set of planes by creating a simply-connected polyhedron. FIG. 5 is a flowchart showing a detailed process of extracting a building as a set of planes.

A building location boundary is stored as a boundary b (step S11). It is determined whether or not the building location boundary b contains an observation point of elevation-data (step S12). If the building location boundary b contains no observation point of elevation-data, the entire process routine is terminated. In contrast, if the building location boundary b contains an observation point(s), an observation point nearest to the building location boundary b is selected and stored in a vertex list (step S13).

A plane p including points in the vertex list stored at the moment is created (step S14). A sum of errors of the points from the plane p is computed. It is determined whether or not errors of the points (including the lastly added observation point) in the vertex list are within a predetermined acceptable error range (step S15).

If the errors exceed the acceptable error range, the lastly added observation point is added to a boundary vertex list (step S16). It is determined whether or not there is an observation point that has not yet been added to the vertex list and that is adjacent to one of the points in the vertex list (step S17). The adjacent observation point is defined using, for example, a Delaunay diagram (described below).

When there is an observation point that has not yet been added to the vertex list, the corresponding point is added to the vertex list (step S18). The process returns to step S14, and the process of extracting the plane p is repeated.

If it is determined in step S17 that there is no adjacent observation point, a boundary c is created from a group of points in the boundary vertex list (step S19).

When the boundary c does not connect to the building location boundary b (step S20), an auxiliary line is added between the building location boundary b and the boundary c (step S21).

A boundary of the plane p is created from the boundary c and part of the building location boundary b (step S22). A closed region indicating the remaining region is created from the boundary c and the remaining portion of the building location boundary b. A boundary of the closed region serves as a new building location boundary b (step S23). Subsequently, the process returns to step S12, and the plane extraction process is repeated.

Figure 21:
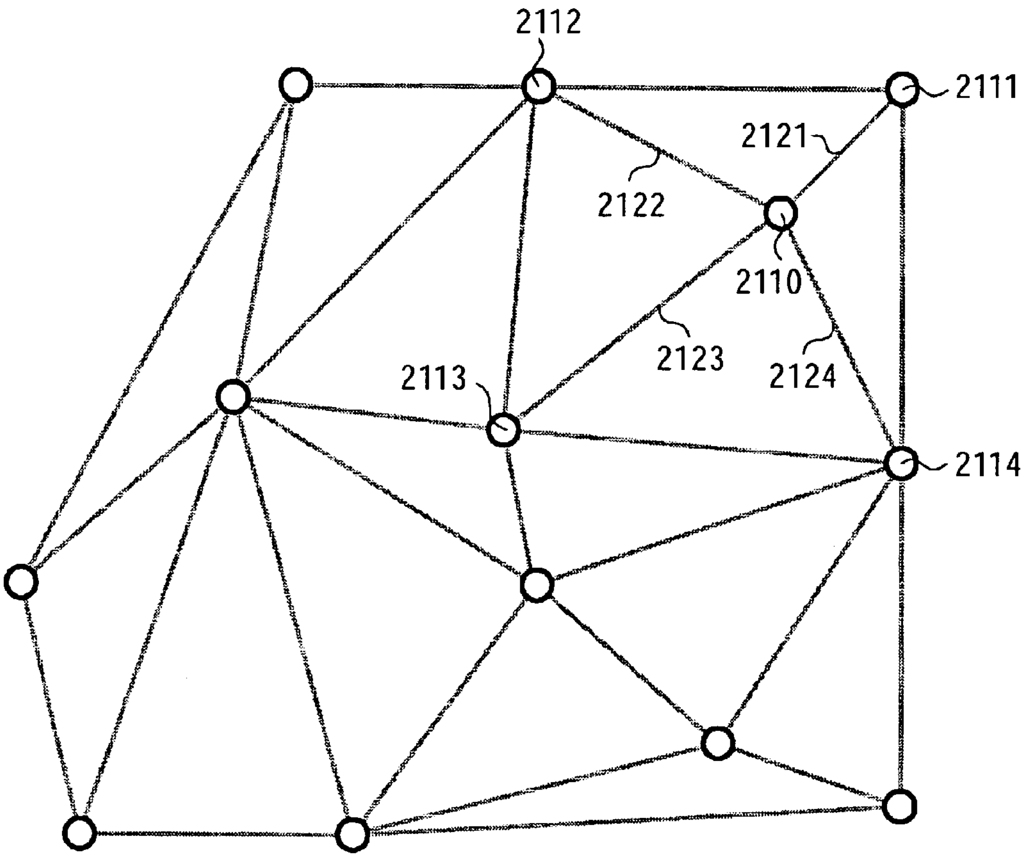
FIG. 21 illustrates a neighborhood graph of observation points using a Delaunay diagram.

In step S17, an adjacent point is defined using a Delaunay diagram in order to determine whether or not there is an observation point adjacent to one of the points in the vertex list. FIG. 21 shows a neighborhood graph of observation points using a Delaunay diagram.

Observation points 2111 to 2114 in the neighborhood of an observation point 2110 are selected by tracking links 2121 to 2124 connected to the observation point 2110.

For a detailed description of Delaunay tessellation, for example, see D. F. Watson, "Computing n-dimensional Delaunay Tessellation with Application to Voronoi Polytops" (The Computer Journal, Vol. 24, No. 2, pp. 167–172 (1981)).

Figure 6:
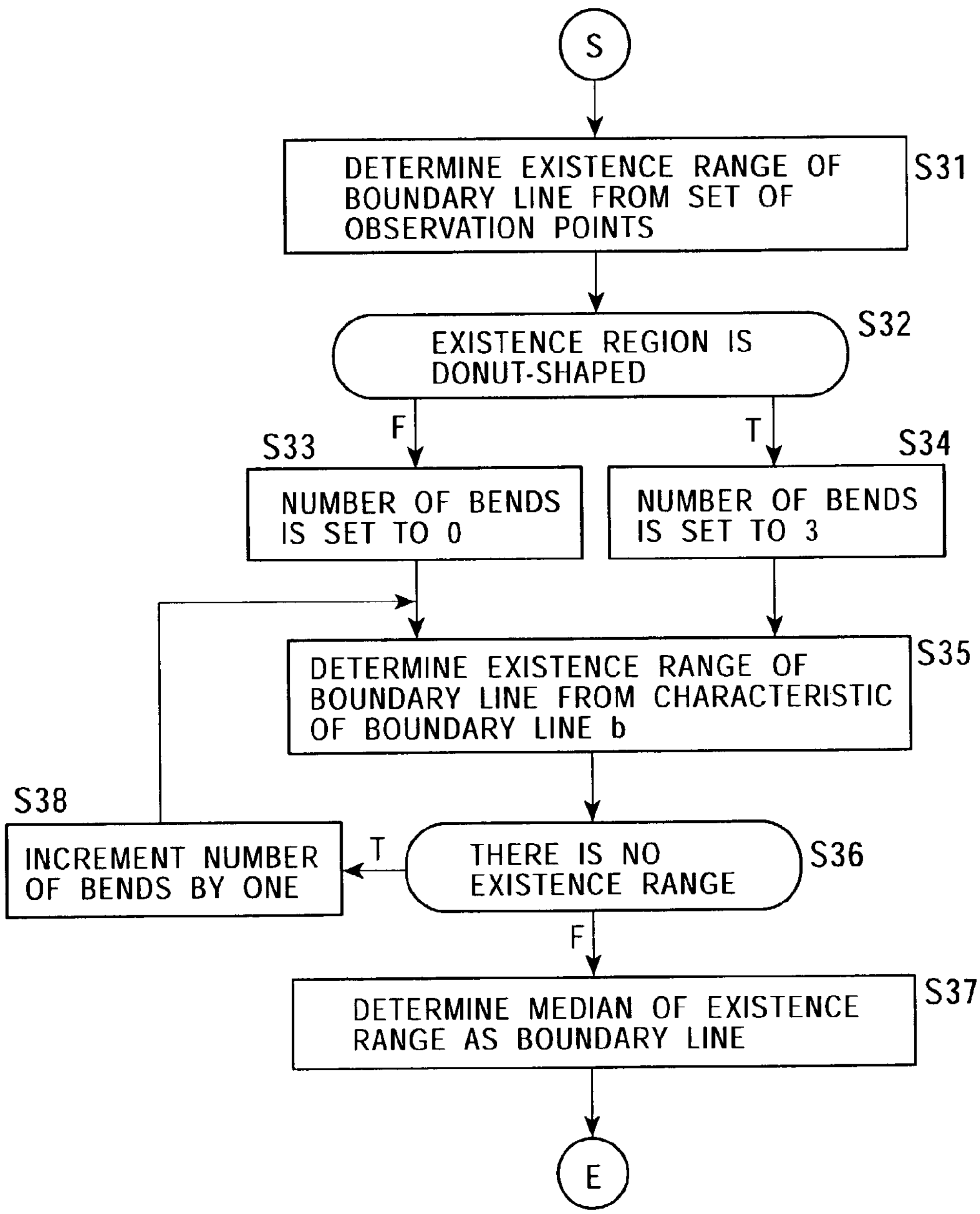
FIG. 6 is a flowchart showing a detailed process of creating a boundary c from points in a boundary vertex list.

FIG. 6 is a flowchart showing a detailed process of creating the boundary c from the points in the boundary vertex list in step S19.

A boundary line existence range is determined on the basis of a set of observation points (step S31). It is determined whether or not a boundary line existence region is donut-shaped (step S32).

When the boundary line existence region is donut-shaped, the number of bends is set to three (step S34). Otherwise, the number of bends is set to zero (step S33).

The boundary line is characterized by the bends and parallelism to the boundary b. On the basis of these characteristics, the existence range of the boundary line to be computed is determined (step S35).

When there is no boundary line existence range (step S36), the number of bends is incremented by one (step S38). The process returns to step S35 and again searches for the boundary line existence range.

In contrast, when it is determined in step S36 that there is an existence range, the median of the existence range is designated as a boundary line (step S37). The entire process routine is completed.

Figure 7:
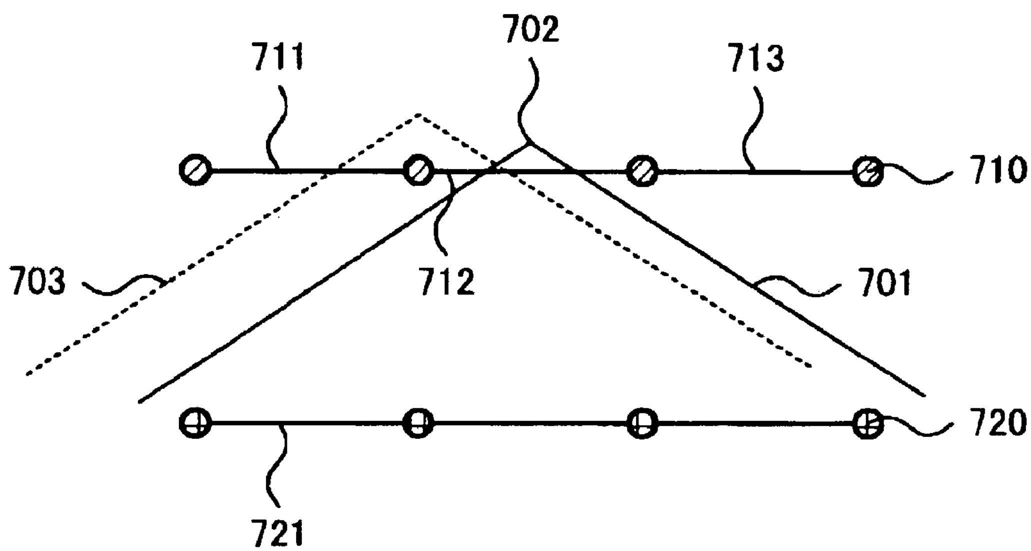
FIG. 7 is an illustration of the manner in which a boundary line having a bend protrudes from an observation-point mesh.

As described above, according to this embodiment, the boundary line between planes in the building location boundary is permitted to bend. FIG. 7 shows the manner in which, on a two-dimensional plane containing an array of observation points to which altitude information is mapped, a boundary line having a bend protrudes from an observation-point mesh.

Referring to FIG. 7, an observation point 710, of observation points fitted to a single plane, is adjacent to an observation point 720 that is not fitted. Lines 711 to 713 and 721 connect the corresponding observation points.

A bend 702 of a boundary line 701 may protrude to the outside. The three-dimensional model generating system according to this embodiment permits the generation of such a boundary line. This is permitted only when each line segment constructing a boundary line crosses only one section, such as the line 712, an even number of times.

In contrast, a boundary line 703 that crosses the lines 711 and 712 connecting the observation points an odd number of times is not permitted.

Figure 8:
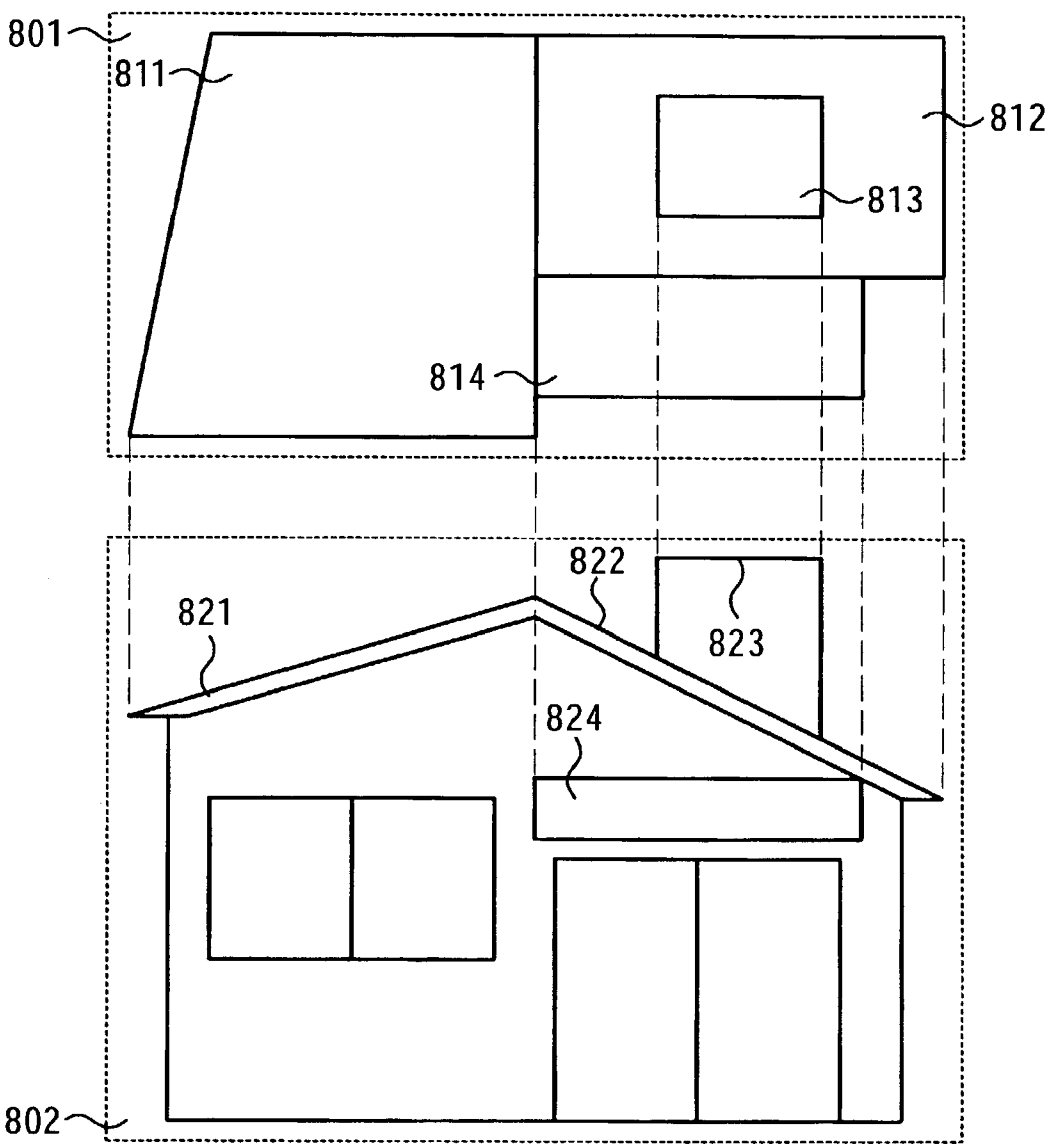
FIG. 8 includes a front view and a top view of an example of a building to be measured.

A specific description of a process of generating a three-dimensional model of the actual building by the three-dimensional model generating system according to this embodiment will now be given. FIG. 8 includes a front view 802 and a top view 801 of an example of a building to be actually measured. The building shown in FIG. 8 includes planes 811 to 814, which are planes when viewed from above and which construct a roof, a chimney, and the like. The planes 811 to 814 correspond to planes 821 to 824, respectively, in the front view 802.

Figure 9:
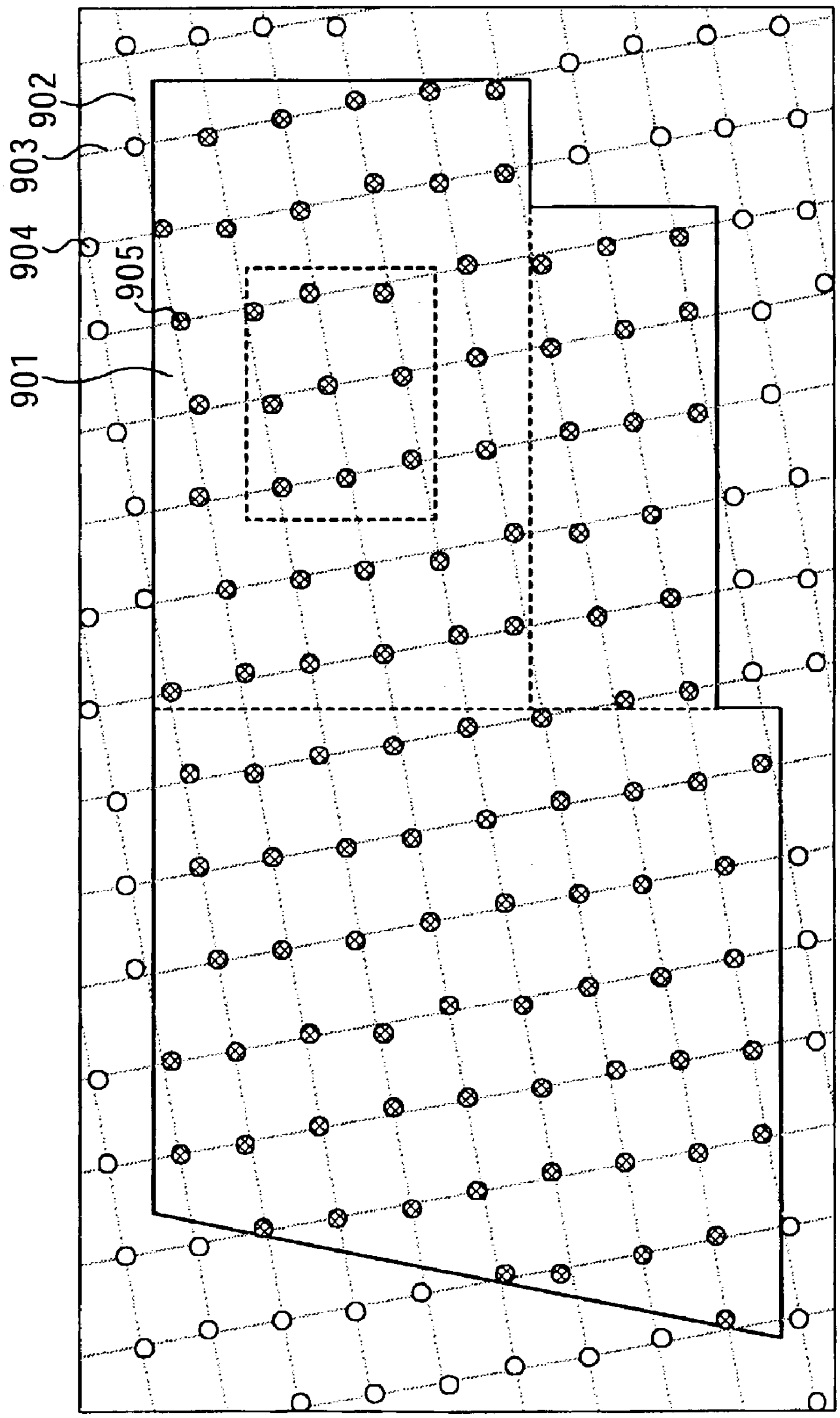
FIG. 9 is an illustration of elevation-data in a building region including the building shown in FIG. 8.

FIG. 9 shows elevation-data of a building region 901 including the building shown in FIG. 8. At this moment, the three-dimensional model generating system only detects the outermost contour of the building, which is represented by the solid line in FIG. 9, on the basis of building information input to the system. However, the system does not recognize boundaries among the planes 811 to 814, which are represented by the dotted lines.

A mesh for obtaining altitude information includes mesh segments 902 and 903. Altitude information is obtained at observation points 904 and 905. The altitude information is distributed over the observation-point mesh with errors. The observation point 905 is located within the building-located region 901. A set of such observation points is processed by the system.

The plane extraction unit 17 extracts planes. More specifically, the plane extraction unit 17 sequentially fits observation points to each plane, starting from the observation point nearest to the outermost contour of the building, on the basis of the elevation-data in the building region 901.

An observation point 1001 near the building location boundary b, which is represented by reference numeral 1060, is selected. By following the observation-point mesh, adjacent observation points are selected one after another and fitted to the plane. In the example shown in FIG. 10, the fitting algorithm starts from the observation point 1001, follows mesh segments 1011, 1012, and 1013, and accordingly selects observation points 1002, 1003, and 1004 in a sequence.

When fitting the observation points to the plane, the three-dimensional model generating system adds an observation point whose altitude information exceeds the error range to the boundary vertex list and creates a boundary between planes constructing the top side of the building on the basis of a group of points in the boundary vertex list. In accordance with the process shown by the flowchart of FIG. 6, the existence region in which the boundary between planes exists is determined on the basis of a set of observation points in the boundary vertex list. The number of bends is set to three if the existence region is donut-shaped, and, otherwise, the number of bends is set to zero. On the basis of the bends and parallelism to the building location boundary, the boundary existence range is defined.

Figure 10:
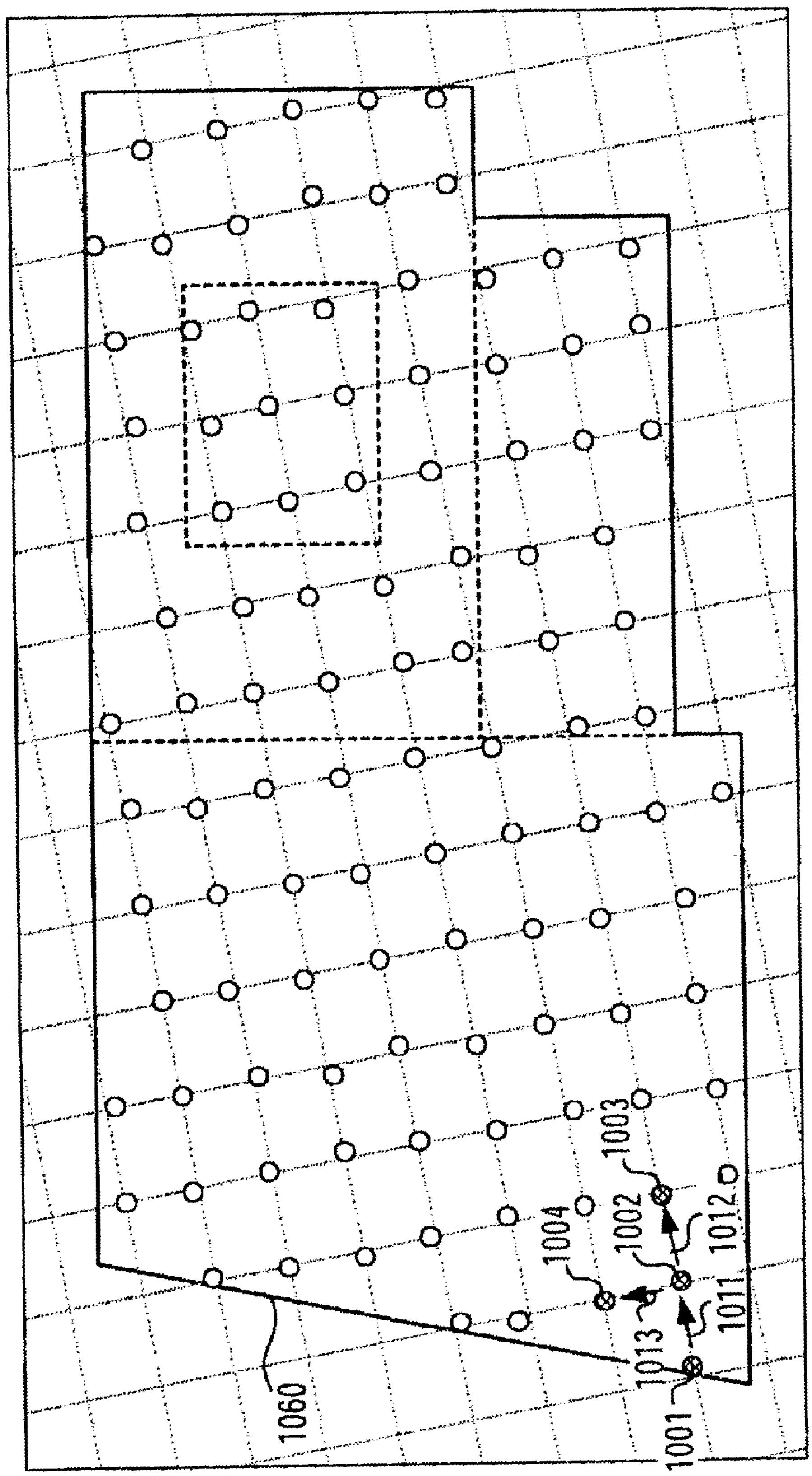
FIG. 10 is an illustration of a process of fitting observation points to a plane in a sequence, starting from the observation point nearest to the outermost contour of the building.
Figure 11:
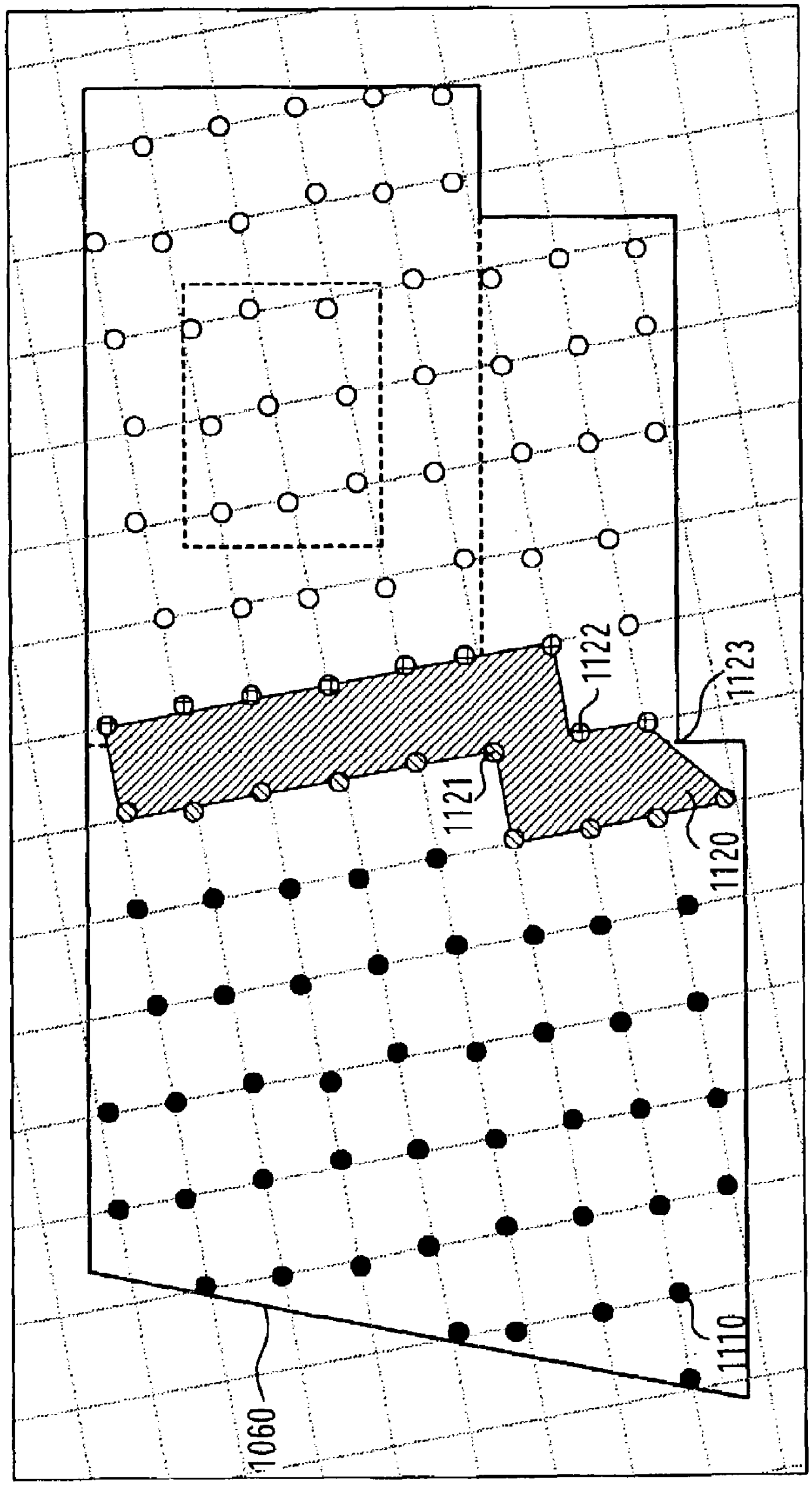
FIG. 11 is an illustration of a region in which a boundary exists (boundary existence region), which is obtained as a result of fitting the observation points to the plane in a sequence, starting from the observation point nearest to the outermost contour of the building.

As shown in FIG. 10, observation points are sequentially fitted to a plane, starting from the observation point nearest to the outermost contour of the building. As a result, as shown in FIG. 11, a plurality of observation points 1110 colored black is fitted to the single plane. At the same time, the boundary vertex list including a plurality of observation points 1121 that cannot be fitted to the plane and observation points 1122 adjacent thereto is created. On the basis of a group of observation points included in the boundary vertex list, a boundary existence region, which is represented by a shaded portion 1120, is determined.

Figure 12:
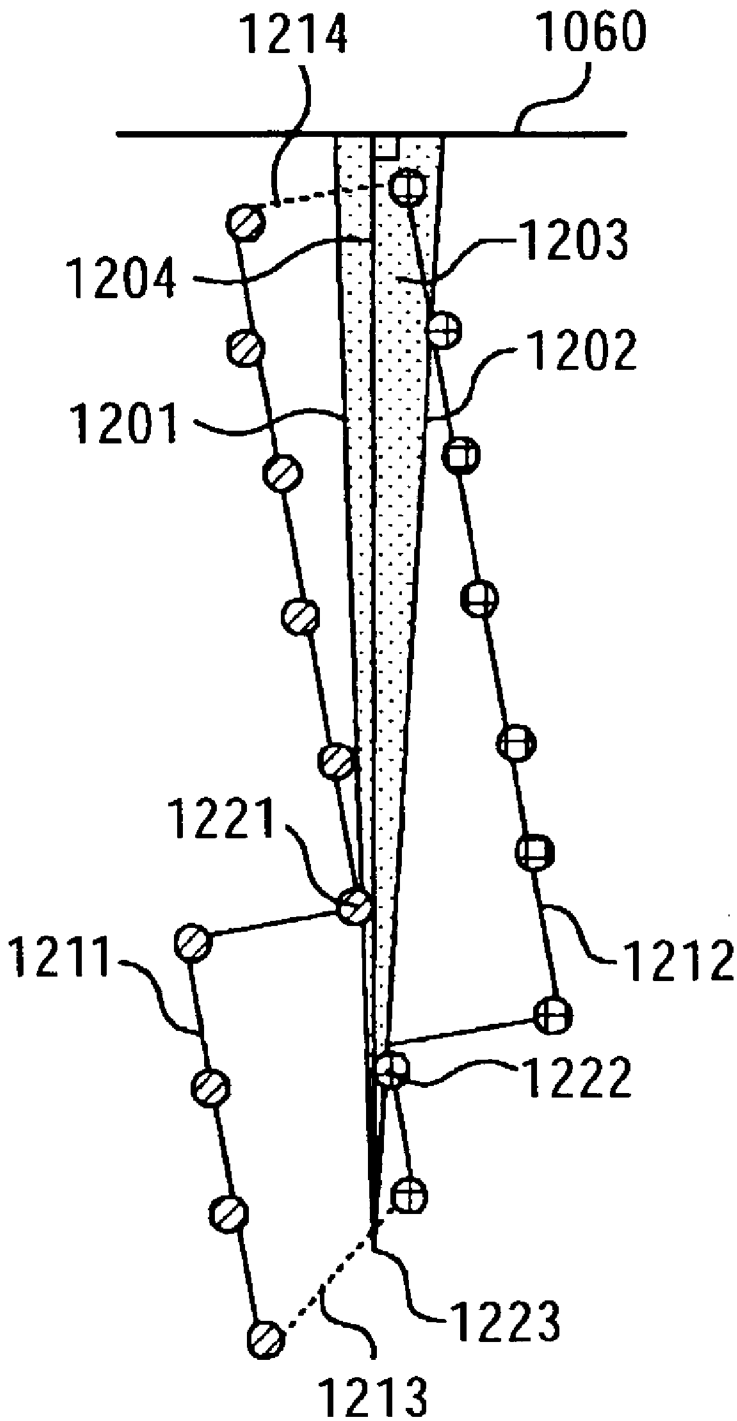
FIG. 12 is an illustration of a process of identifying the boundary using a characteristic of a building location boundary b.

Using a characteristic 1123 of the building location boundary b, the three-dimensional model generating system according to this embodiment identifies the boundary. FIG. 12 shows the manner in which a boundary(s) between two or more planes constructing the top side of a building is identified.

Observation points 1221 and 1222 are used to identify a boundary region. A boundary(s) between two or more planes constructing the top side of a building is a straight line or a polyline passing between two lines 1211 and 1212.

Line segments 1213 and 1214 indicate places where a boundary line passes through. The number of such line segments is two if there is no loop. If there is a loop, the number of such line segments is zero. If there is no loop, a boundary line to be computed (and its extension) crosses the two line segments. The building location boundary b, which is represented by reference numeral 1060, has a characteristic 1223 corresponding to the characteristic 1123 of the boundary b in FIG. 11.

With prerequisite knowledge that the boundary line connects to a bend of the boundary b or the like, a group of lines is obtained that pass the line segment 1223, pass through the line segment 1213, pass between the line segments 1211 and 1212 so as not to protrude beyond the line segments 1211 and 1212, pass through the line segment 1214, and finally reach the building location boundary 1060.

A region 1203 containing the group of lines is defined between line segments 1201 and 1202. With prerequisite knowledge of building architecture that the boundary line is perpendicular to the boundary b, a boundary line 1204 serving as the boundary line is uniquely determined.

The prerequisite knowledge described here refers to general rules on the building structure. For example, such rules are registered beforehand for use in the three-dimensional model generating system.

Figure 13:
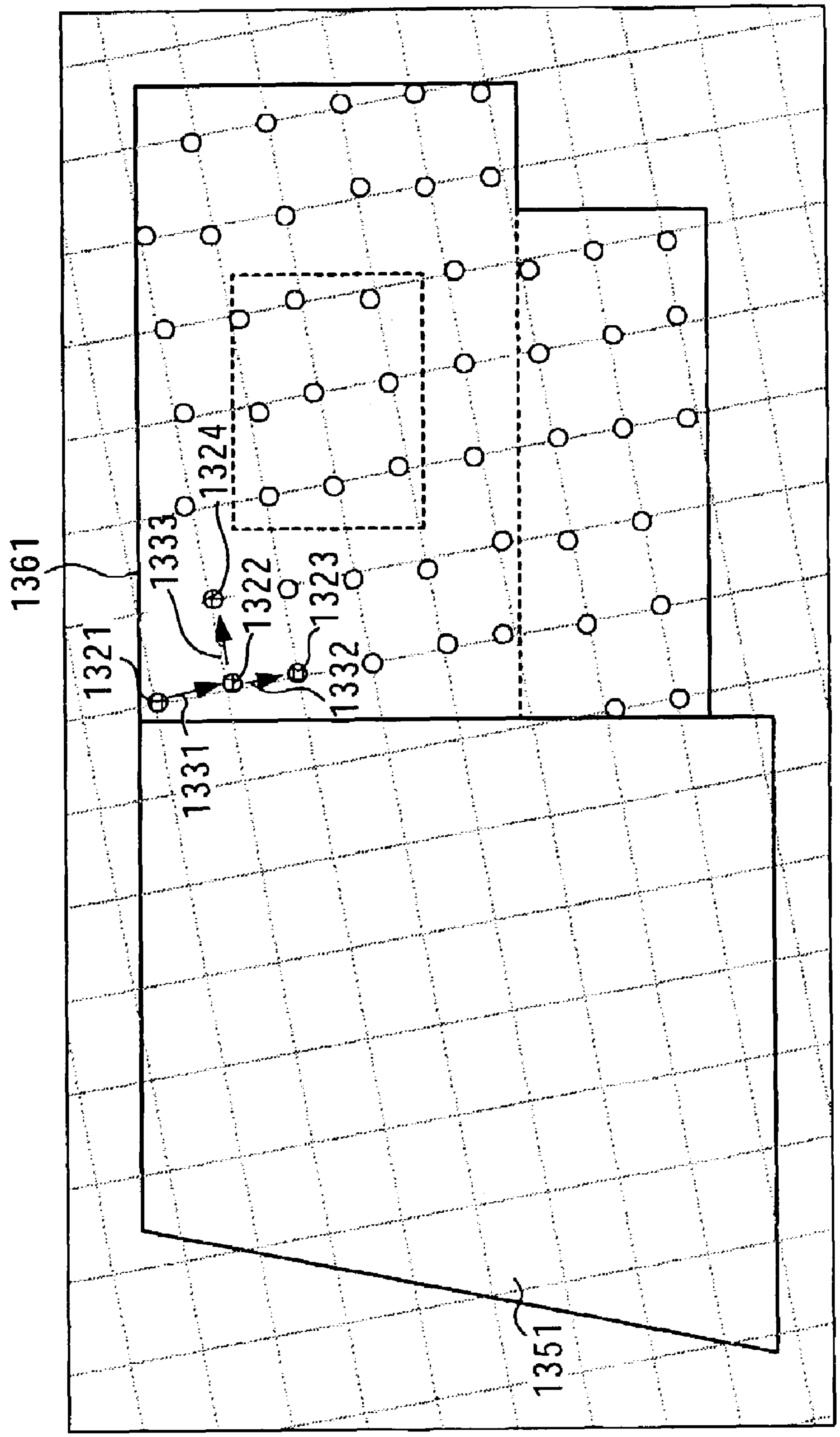
FIG. 13 is an illustration of a process of separating the identified plane and continuously fitting the observation points to the remaining region of the building-located region.

As discussed above, a plane is extracted by identifying the boundary of the plane. As shown in FIG. 13, the identified plane is separated from the building-located region 901. The remaining region is continuously subjected to the plane fitting algorithm.

FIG. 13 shows an identified plane 1351 and a new boundary b, which is represented by reference numeral 1361 and which is reconstructed by the identified boundary line. The fitting algorithm starts from an observation point 1321 near the building location boundary b, follows an observation-point mesh, and selects and fits adjacent observation points to the plane.

In the example shown in FIG. 13, the fitting algorithm starts from the observation point 1321, follows mesh segments 1331, 1332, and 1333, and accordingly selects observation points 1322, 1323, and 1324 adjacent thereto in a sequence.

Figure 14:
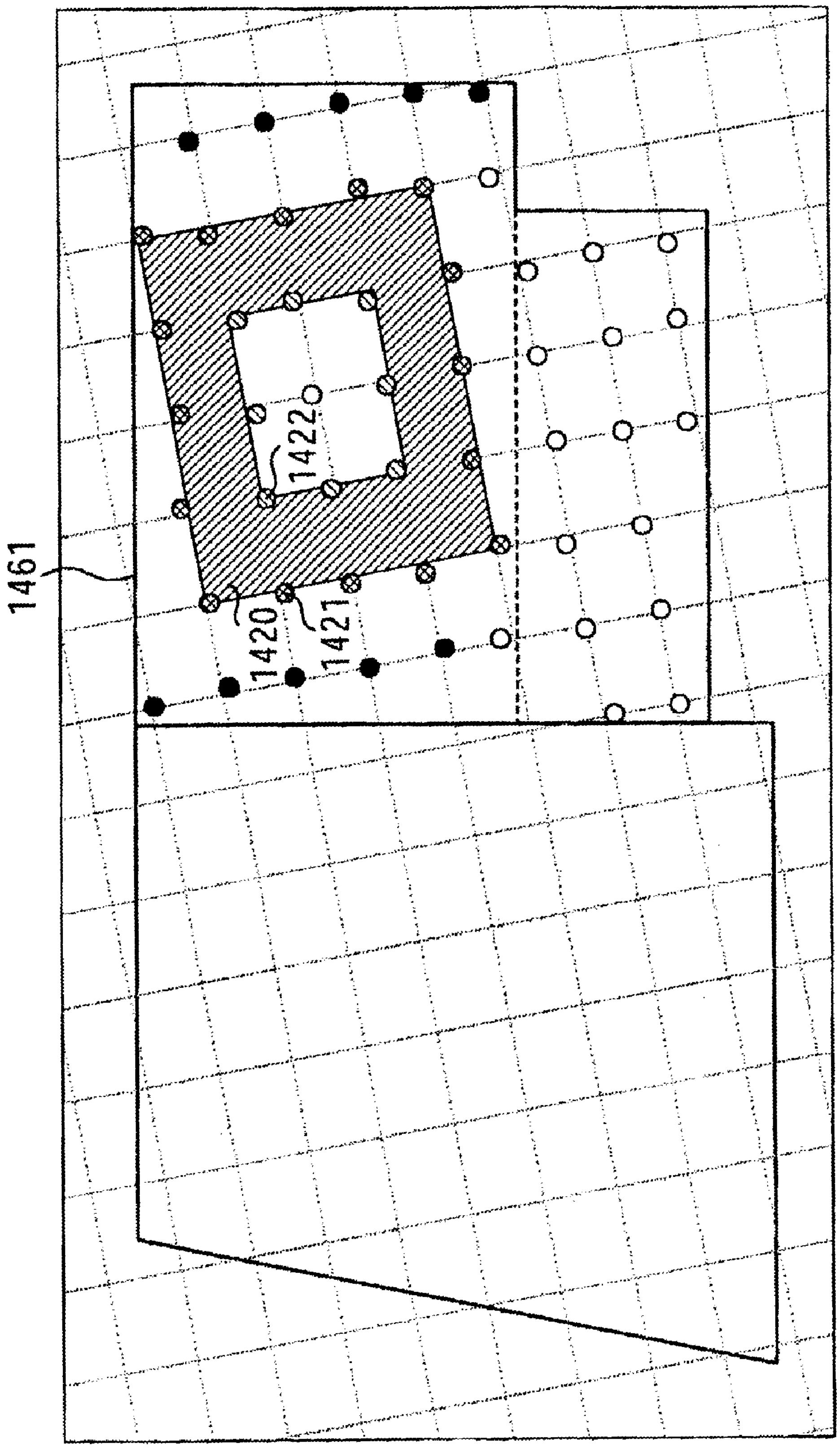
FIG. 14 is an illustration of a boundary existence region in the remaining region of the building-located region.

FIG. 14 shows a boundary existence region in the remaining region of the building-located region shown in FIG. 13. In the building location boundary b, which is represented by reference numeral 1461, a shaded region 1420 defined by a group of observation points 1421, 1422, . . . contains a boundary between planes constructing the top side of the building.

Figure 15:
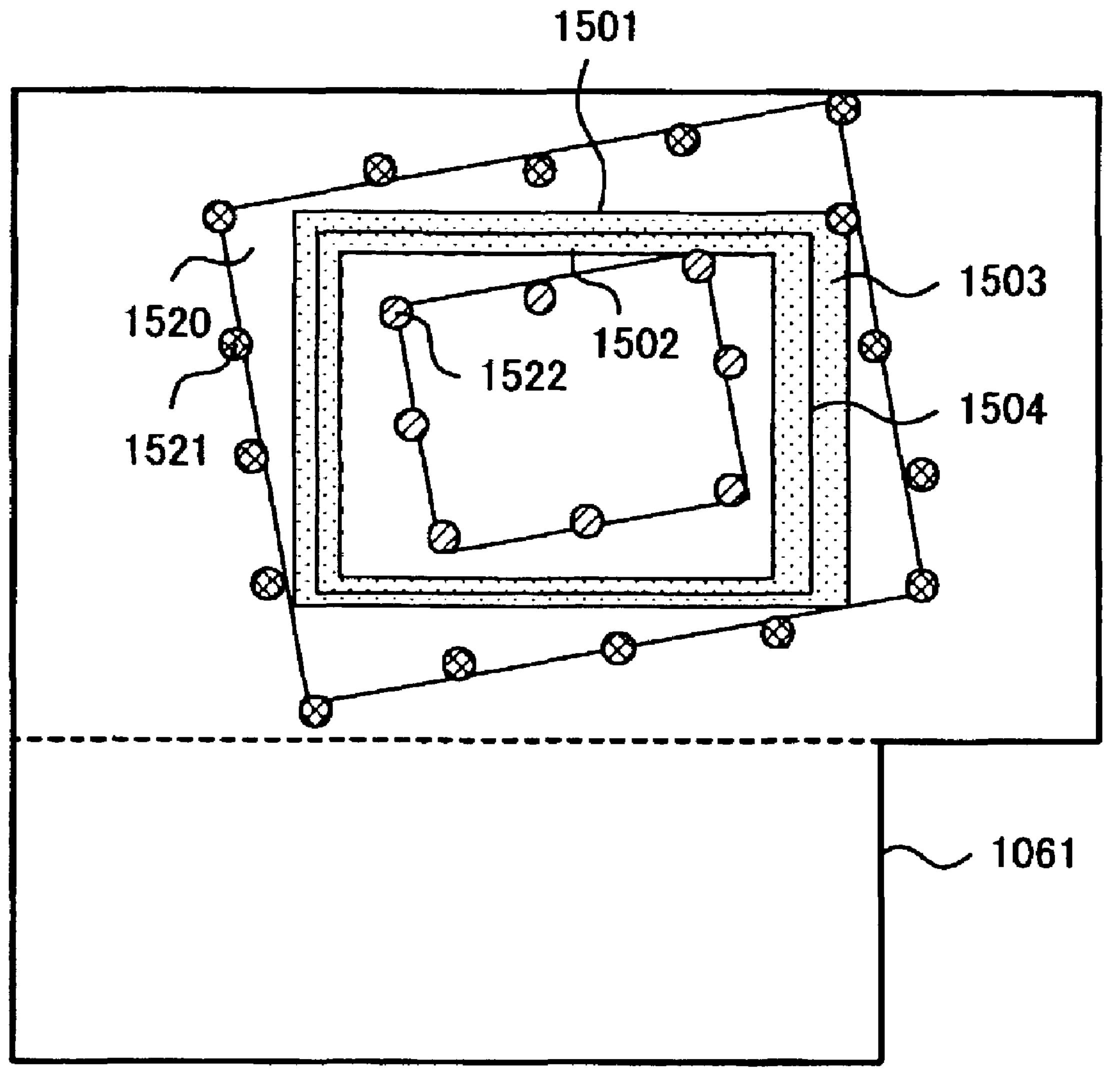
FIG. 15 is an illustration of a process of identifying a boundary between planes from a shaded region 1420 shown in FIG. 14.

FIG. 15 illustrates a process of identifying a boundary between planes from the shaded region 1420 shown in FIG. 14. Referring to FIG. 15, observation points 1521 and 1522 are used to identify a boundary region. The boundary between planes is a straight line or a polyline that passes between the two point groups 1521 and 1522. A portion 1520, corresponding to the shaded portion 1420 of FIG. 14, is an existence region in which such a boundary line exists. Since there is no line segment that the boundary line passes through in FIG. 15, the boundary line to be computed is a loop.

With the prerequisite knowledge that the boundary line is parallel to the boundary b, which is represented by reference numeral 1061 (described above), the boundary line is contained in a region 1503 defined by rectangles 1501 and 1502. The median of the region 1503 is extracted as a line segment 1504 serving as the boundary line between planes constructing the remaining region.

Figure 16:
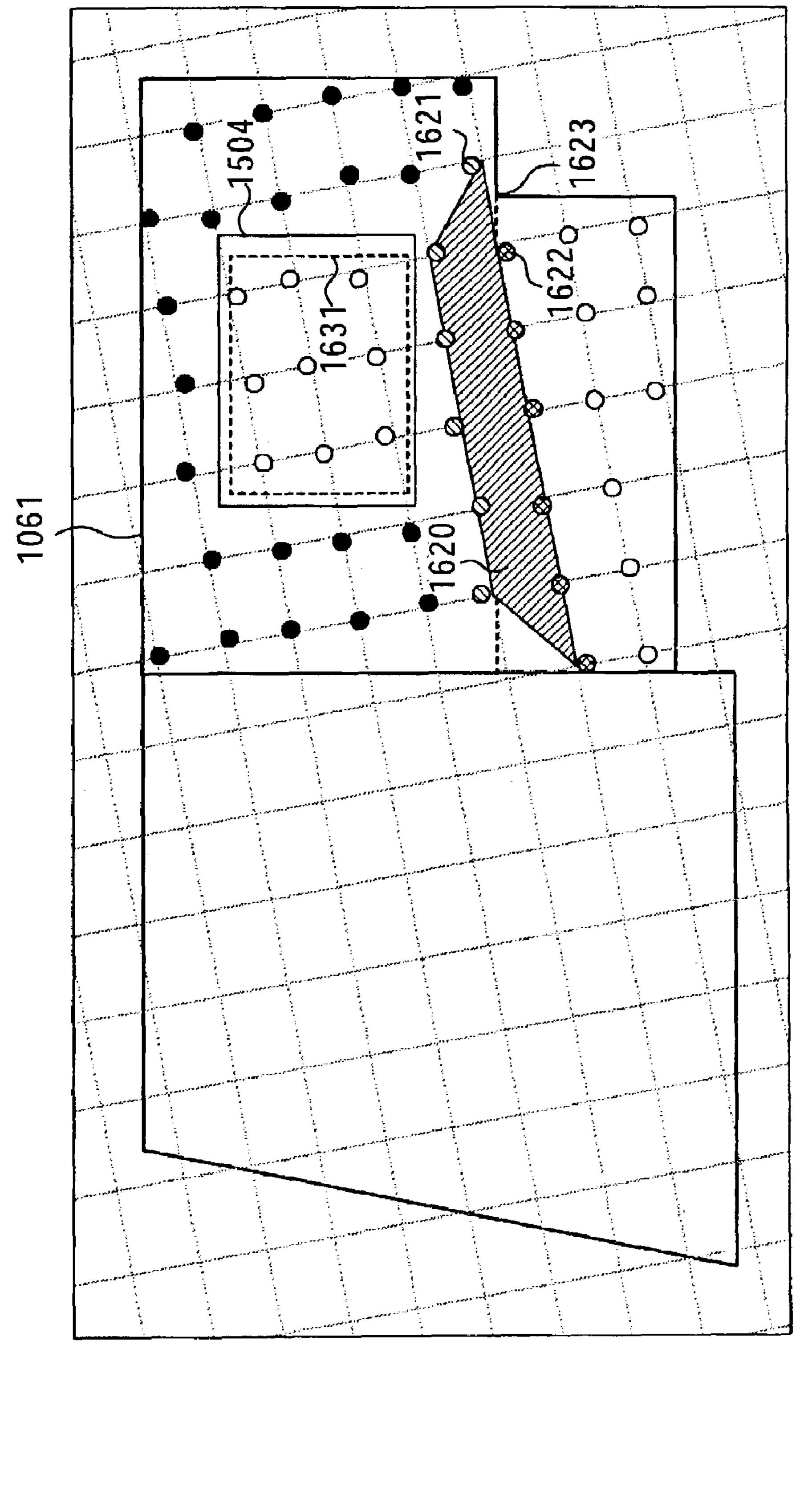
FIG. 16 is an illustration of another boundary existence region in the remaining region of the building-located region shown in FIG. 13.

FIG. 16 shows another boundary existence region in the remaining region of the building-located region. Referring to FIG. 16, a region 1620 defined by a group of observation points 1621 and 1622 contains the boundary. The boundary line is identified using a bend 1623 that characterizes the building location boundary b, which is represented by reference numeral 1061.

The boundary 1504 obtained in FIG. 15 is deviated from the actual boundary position 1631. The deviation is due to the fineness of the observation mesh and can be solved by further reducing the observation intervals.

Figure 17:
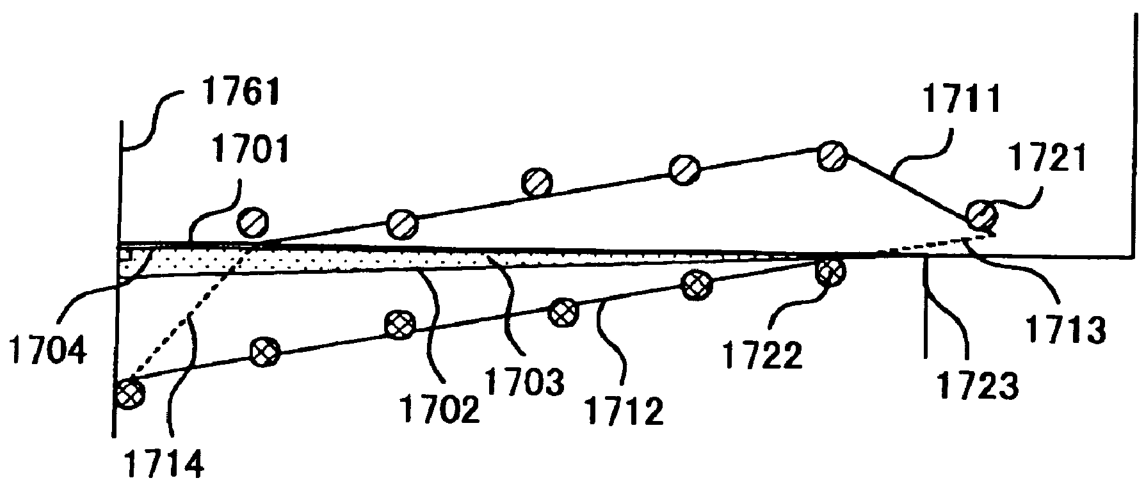
FIG. 17 is an illustration of a process of identifying a boundary between planes from a shaded region 1620 shown in FIG. 16.

FIG. 17 illustrates a process of identifying the boundary between planes from the shaded region 1620 shown in FIG. 16. Referring to FIG. 17, the building location boundary b, which is represented by reference numeral 1761, contains a characteristic point 1723 of the building location boundary b.

Observation points 1721 and 1722 are used to identify the boundary region. The boundary between planes constructing the top side of the building is a straight line or a polyline passing between two lines 1711 and 1712.

Line segments 1713 and 1714 indicate places where the boundary line passes through. The boundary line crosses the two line segments 1713 and 1714. The building location boundary b, which is represented by reference numeral 1761, has the characteristic 1723 (corresponding to the characteristic 1623 in FIG. 16) of the building location boundary b.

With the prerequisite knowledge that the boundary line connects to a bend of the boundary b or the like, a group of lines is obtained that pass the characteristic point 1723, pass through the line segment 1713, pass between the line segments 1711 and 1712 so as not to protrude beyond the line segments 1711 and 1712, pass through the line segment 1714, and finally reach the building location boundary 1761.

A region 1703 containing the group of lines is defined between line segments 1701 and 1702. With the prerequisite knowledge that the boundary line between planes is perpendicular to the building location boundary b (described above), a line segment 1704 serving as the boundary line is uniquely determined.

Figure 18:
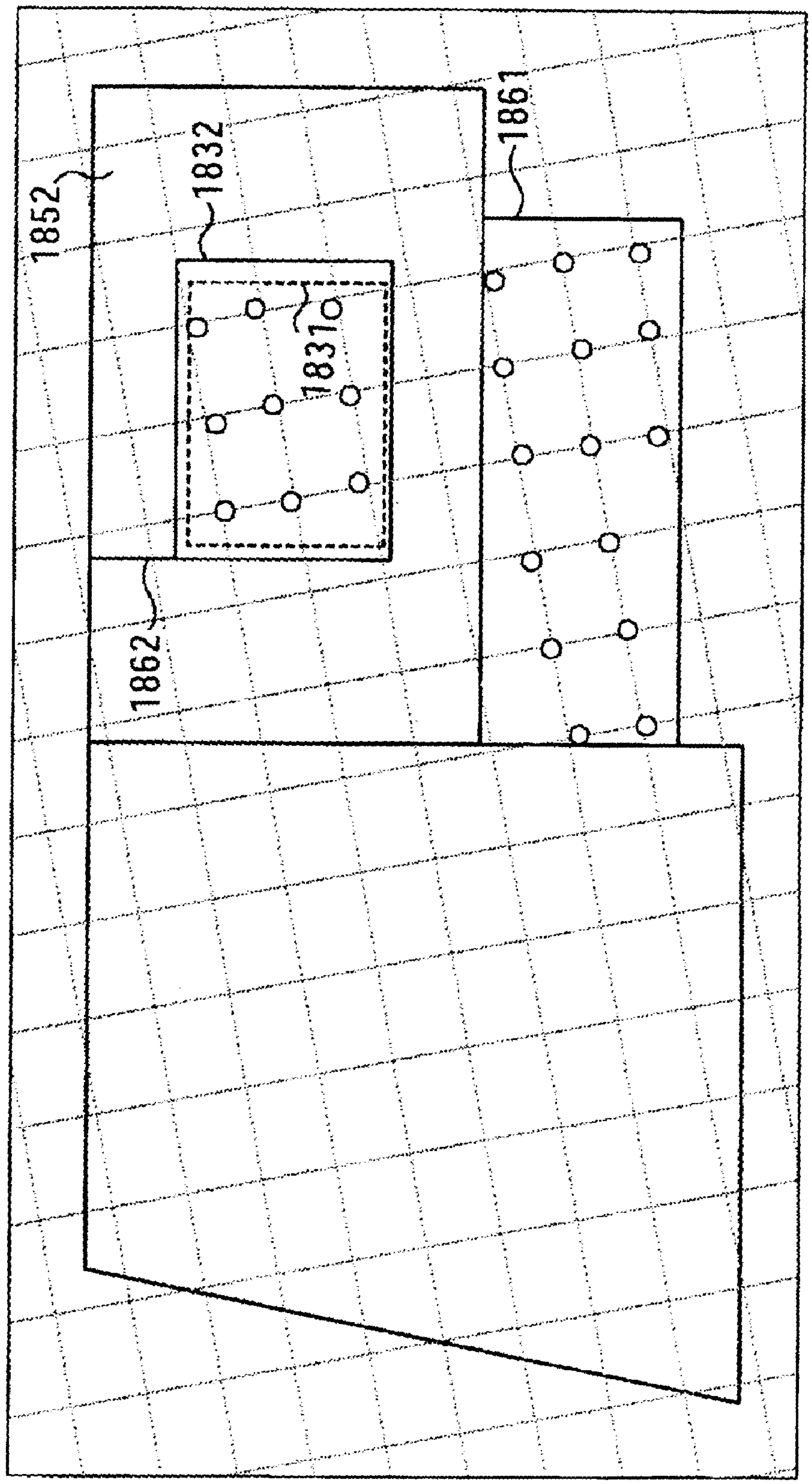
FIG. 18 is an illustration of a process of adding an auxiliary line when the boundary is closed.

FIG. 18 illustrates a process of adding an auxiliary line when a boundary is closed. FIG. 18 shows a boundary line 1832 extracted in FIG. 15 and the actual boundary line 1831.

The extracted boundary line 1832 is a loop and has no contact with the boundary b. Therefore, an auxiliary line 1862 is drawn to extract a plane 1852.

Reference numeral 1861 represents the building location boundary b that is updated by the boundary line extracted in FIG. 17.

Figure 19:
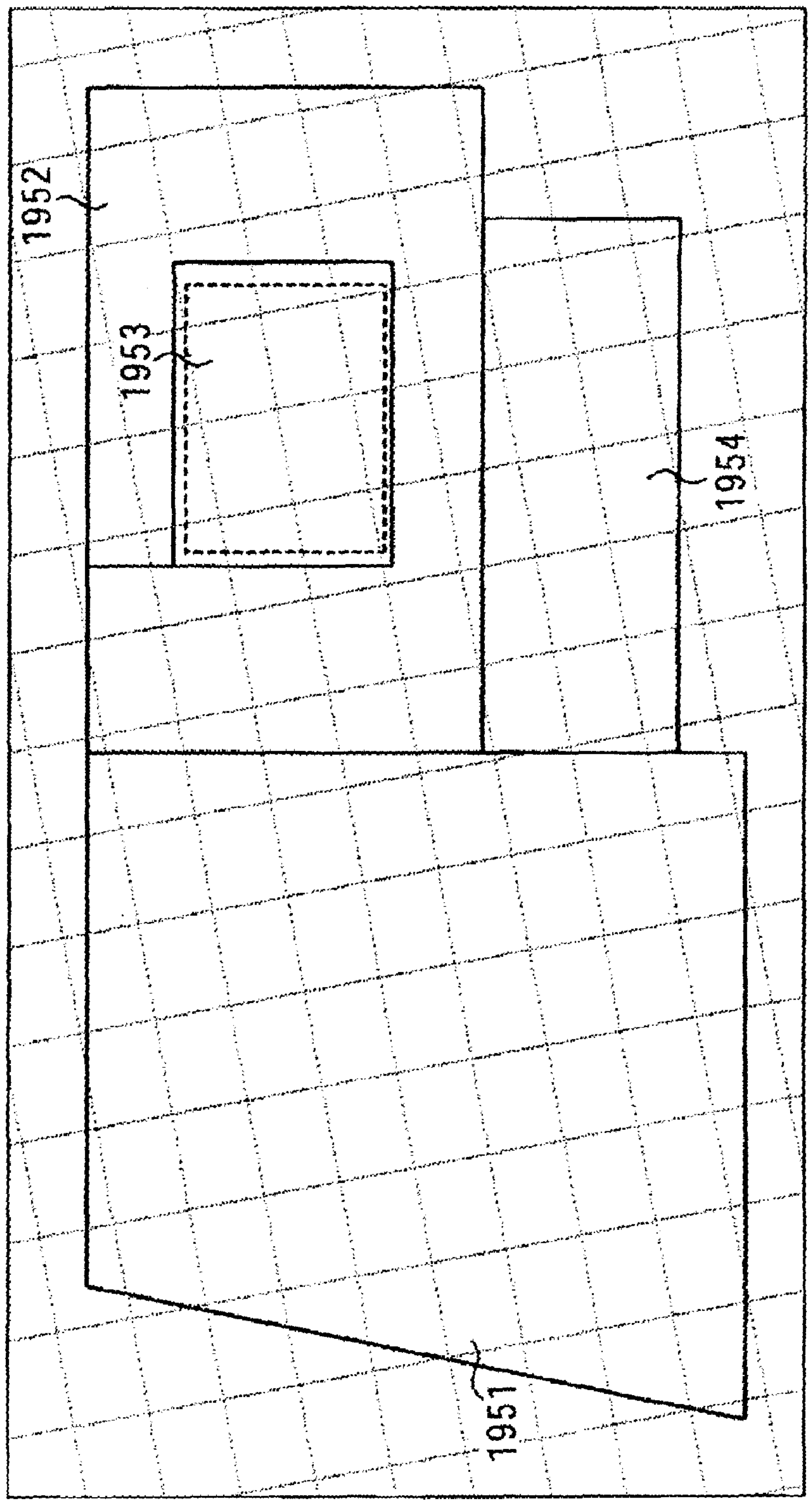
FIG. 19 is an illustration of a set of planes extracted from elevation-data.

FIG. 19 shows a set of planes extracted from the elevation-data shown in FIG. 9 by the processes described with reference to FIGS. 10 to 18. As shown in FIG. 19, four planes 1951 to 1954 are created from the elevation-data. This corresponds to the original three-dimensional shape, which is shown in FIG. 8, of the building for which the elevation-data is actually measured.

Figure 20:
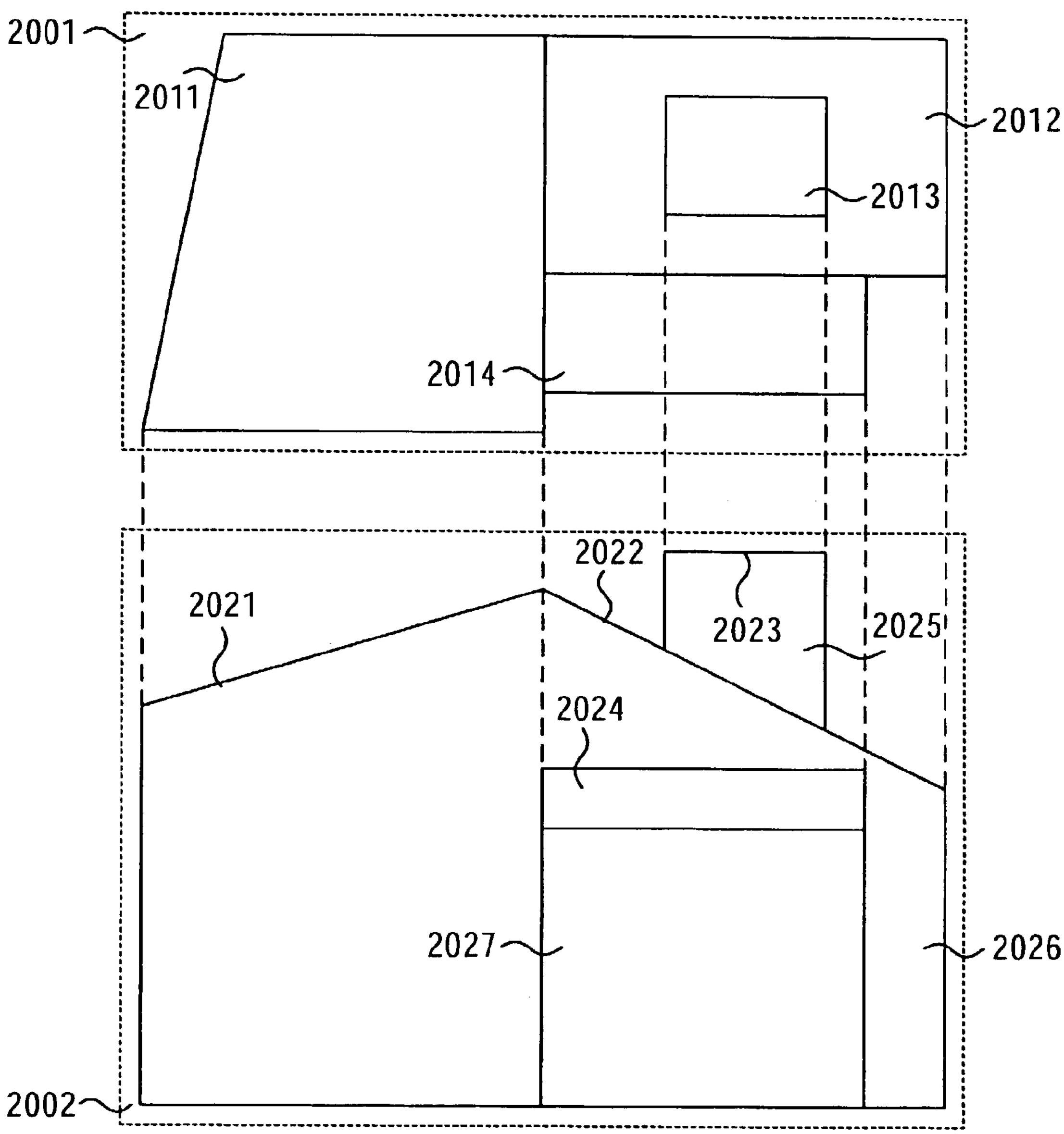
FIG. 20 illustrates a process of constructing a three-dimensional building model by adding vertical planes to planes constructing the top side of a building, which are obtained from the elevation-data.

FIG. 20 illustrates a process of constructing a three-dimensional building model by adding vertical planes to the planes constructing the top side of the building, which are obtained from the elevation-data.

FIG. 20 includes a top view 2001 and a front view 2002 of the generated three-dimensional building mode.

Planes 2011 to 2014 correspond to planes 2021 to 2024, respectively. Vertical planes 2025 to 2027 are created on the basis of the boundary line information identified in FIGS. 12, 15, and 17.

Although only the planes that are visible when viewed from the front are shown in FIG. 20, all planes that are estimated to exist in the vertical direction are created. Subsequently, the plane connection unit 18 connects all the planes to create a simply-connected polyhedron. Such a three-dimensional building model is recorded as building data in the storage unit 13.

While the present invention has been described with reference to what are presently considered to be the preferred embodiments, it is to be understood that modifications and substitutions can be made by those skilled in the art without departing from the scope of the present invention. In other words, the present invention has been described using the embodiments only for illustration purposes and should not be interpreted in a limited manner. The scope of the present invention is to be determined solely by the appended claims.

It is to be understood by those skilled in the art that the present invention is easily extended by replacing the word "building" in the appended claims with, for example, an artificial structure such as a bridge, bank, or breakwater or a natural structure such as a mountain, cliff or rock. In other words, it is to be understood that various three-dimensional model generating apparatuses, methods, systems, and programs using (1) information on ground regions and (2)

information on other regions that can be distinguished from the ground, both of which are included in two-dimensional map data, are considered to be equivalents of the present invention as long as they are based on a spirit similar to the present invention. In this case, the information on ground regions and the information on other regions that can be distinguished from the ground may be used instead of the two-dimensional map data.

It is to be understood by those skilled in the art that the present invention is easily extended by replacing the word "elevation-data" in the appended claims with simple altitude data. In other words, it is to be understood that various three-dimensional model generating apparatuses, methods, systems, and programs using information on ground regions, information on other regions that can be distinguished from the ground, and altitude data are considered to be equivalents of the present invention as long as they are based on a spirit similar to the present invention.

Japanese Patent Application No. 2002-089967 (filed on Mar. 27, 2002) discloses three-dimensional modeling of a building portion using information on ground regions, information on other regions that can be distinguished from the ground, and altitude data. Japanese Patent Application No. 2002-089966 (filed on Mar. 27, 2002) discloses three-dimensional modeling of a terrain portion using information on ground regions, information on other regions that can be distinguished from the ground, and altitude data. The complete disclosures of these Japanese patent applications are incorporated herein by reference.

What is claimed is:

1. A three-dimensional model generating system for generating a building model on the basis of map information describing the arrangement of building regions and roads on a two-dimensional plane and elevation-data that is generated by mapping altitude information to each observation point on the two-dimensional plane, comprising:

a coordinate transform obtaining unit that performs coordinate transformation from the map information to the elevation-data;

a building region extracting unit that arranges the altitude information according to each building region;

a plane extraction unit that extracts planes including the altitude information on the basis of the altitude information according to each building region;

a boundary line identifying unit that identifies a boundary between the planes; and a plane connection unit that connects the planes, between which the boundary has been identified, whereby the building model formed of a simply-connected polyhedron is generated, wherein the plane extraction unit extracts, as vertices constructing a plane in a building location boundary, observation points whose altitude information are contained by the same plane within an acceptable error range and generates the plane including the extracted vertices;

the plane extraction unit extracts, as boundary vertices of the boundary between the planes in the building location boundary, observation points whose altitude information are not contained by the same plane within the acceptable error range, and determines the boundary between the planes in the building location boundary on the basis of the extracted boundary vertices; and when the boundary between the planes, the boundary being determined on the basis of the boundary vertices extracted in the building location boundary, does not connect to the building location boundary, the boundary line identifying unit adds an auxiliary line so that the boundary between the planes connects to the building location boundary.

2. A three-dimensional model generating system for generating a building model on the basis of map information describing the arrangement of building regions and roads on a two-dimensional plane and elevation-data that is generated by mapping altitude information to each observation point on the two-dimensional plane, comprising:

a coordinate transform obtaining unit that performs coordinate transformation from the map information to the elevation-data;

a building region extracting unit that arranges the altitude information according to each building region;

a plane extraction unit that extracts planes including the altitude information on the basis of the altitude information according to each building region;

a boundary line identifying unit that identifies a boundary between the planes; and a plane connection unit that connects the planes, between which the boundary has been identified, whereby the building model formed of a simply-connected polyhedron is generated, wherein the plane extraction unit extracts, as vertices constructing a plane in a building location boundary, observation points whose altitude information are contained by the same plane within an acceptable error range and generates the plane including the extracted vertices;

the plane extraction unit extracts, as boundary vertices of the boundary between the planes in the building location boundary, observation points whose altitude information are not contained by the same plane within the acceptable error range, and determines the boundary between the planes in the building location boundary on the basis of the extracted boundary vertices; and the boundary line identifying unit determines an existence region in which the boundary between the planes exists; the boundary line identifying unit sets the number of bends to three when the existence region is donut-shaped, and, otherwise, sets the number of bends to zero; and the boundary line identifying unit defines a boundary existence range on the basis of the bends and parallelism to the building location boundary.

3. The three-dimensional model generating system according to claim 2, wherein, when the boundary existence range cannot be specified, the boundary line identifying unit increments the number of bends and again searches for the boundary existence range.

4. A three-dimensional model generating method for generating a building model on the basis of map information describing the arrangement of building regions and roads on a two-dimensional plane and elevation-data that is generated by mapping altitude information to each observation point on the two-dimensional plane, comprising:

a coordinate transform obtaining step of performing coordinate transformation from the map information to the elevation-data;

a building region extracting step of arranging the altitude information according to each building region;

a plane extraction step of extracting planes including the altitude information on the basis of the altitude information according to each building region;

a boundary line identifying step of identifying a boundary between the planes; and a plane connection step of connecting the planes, between which the boundary has been identified, whereby the building model formed of a simply-connected polyhedron is generated, wherein, in the plane extraction step, observation points whose altitude information are contained by the same plane within an acceptable error range are extracted as vertices constructing a plane in a building location boundary, and the plane including the extracted vertices is generated;

in the boundary line identifying step, observation points whose altitude information are not contained by the same plane within the acceptable error range are extracted as boundary vertices of the boundary between the planes in the building location boundary, and the boundary between the planes in the building location boundary is determined on the basis of the extracted boundary vertices; and in the boundary line identifying step, when the boundary between the planes, the boundary being determined on the basis of the boundary vertices extracted in the building location boundary, does not connect to the building location boundary, an auxiliary line is added so that the boundary between the planes connects to the building location boundary.

5. A three-dimensional model generating method for generating a building model on the basis of map information describing the arrangement of building regions and roads on a two-dimensional plane and elevation-data that is generated by mapping altitude information to each observation point on the two-dimensional plane, comprising:

a coordinate transform obtaining step of performing coordinate transformation from the map information to the elevation-data;

a building region extracting step of arranging the altitude information according to each building region;

a plane extraction step of extracting planes including the altitude information on the basis of the altitude information according to each building region;

a boundary line identifying step of identifying a boundary between the planes; and a plane connection step of connecting the planes, between which the boundary has been identified, whereby the building model formed of a simply-connected polyhedron is generated, wherein, in the plane extraction step, observation points whose altitude information are contained by the same plane within an acceptable error range are extracted as vertices constructing a plane in a building location boundary, and the plane including the extracted vertices is generated;

in the boundary line identifying step, observation points whose altitude information are not contained by the same plane within the acceptable error range are extracted as boundary vertices of the boundary between the planes in the building location boundary, and the boundary between the planes in the building location boundary is determined on the basis of the extracted boundary vertices; and in the boundary line identifying step, an existence region in which the boundary between the planes exists is determined; the number of bends is set to three when the existence region is donut-shaped, and, otherwise, the number of bends is set to zero; and a boundary existence range is defined on the basis of the bends and parallelism to the building location boundary.

6. The three-dimensional model generating method according to claim 5, wherein, in the boundary line identifying step, when the boundary existence range cannot be specified, the number of bends is incremented and the boundary existence range is again searched for.

* * * * *